US012076617B2

(12) United States Patent
Fazzini et al.

(10) Patent No.: US 12,076,617 B2
(45) Date of Patent: *Sep. 3, 2024

(54) GOLF BALL LOCATING NONLINEAR RADAR SYSTEM EMPLOYING A SNOWFLAKE NONLINEAR PASSIVE TAG AND ASSOCIATED METHOD(S)

(71) Applicants: Ballocator LLC, South Salt Lake, UT (US); Texas Tech University System, Lubbock, TX (US)

(72) Inventors: Dan Fazzini, Pinellas Park, FL (US); Robert B. Fazzini, Bloomington, IL (US); Steven Johnson, Bloomington, IL (US); Changzhi Li, Lubbock, TX (US); Vishal Gajendrarao Yadav, Lubbock, TX (US); Emmanuel Camacho, Crane, TX (US); Rhyse James Ishmael Joseph, Lubbock, TX (US); Leya Zeng, Lubbock, TX (US)

(73) Assignees: Ballocator LLC, South Salt Lake, UT (US); Texas Tech University System, Lubbock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/542,878

(22) Filed: Dec. 18, 2023

(65) Prior Publication Data

US 2024/0123283 A1    Apr. 18, 2024

Related U.S. Application Data

(63) Continuation-in-part of application No. 18/315,097, filed on May 10, 2023, now Pat. No. 11,892,537.

(Continued)

(51) Int. Cl.
A63B 24/00    (2006.01)

(52) U.S. Cl.
CPC .. *A63B 24/0021* (2013.01); *A63B 2024/0053* (2013.01); *A63B 2225/54* (2013.01)

(58) Field of Classification Search
None
See application file for complete search history.

(56) References Cited

U.S. PATENT DOCUMENTS 3,781,879 A * 12/1973 Staras ................... G01S 13/931
                                                                    342/72
5,525,967 A *  6/1996 Azizi ...................... G01S 13/74
                                                                    340/572.1

(Continued)

FOREIGN PATENT DOCUMENTS

WO    WO01/037945 A2 *  5/2001    ......... A63B 24/0021

OTHER PUBLICATIONS

N. A. Al-Ahmadi, "Metal oxide semiconductor-based Schottky diodes: a review of recent advances"; 2020 Mater. Res. Express 7 032001; on the Internet at iopscience.iop.org. (Year: 2020).*

(Continued)

*Primary Examiner* — Bernarr E Gregory
(74) *Attorney, Agent, or Firm* — Ashkan Najafi

(57) ABSTRACT

A nonlinear radar system includes a first antenna configured to generate and emit an incident signal having a first frequency, a transponder tag attached to an existing portable object, wherein the transponder tag includes an electromagnetic nonlinear element configured to be detected by the incident signal. Upon being detected by the incident signal, the transponder tag is configured to transmit a reflected return harmonic signal having a second frequency different from the first frequency, wherein the reflected return harmonic signal is an on-off keying (OOK) signal. A second antenna is configured to receive the reflected return harmonic signal having the second frequency. The transponder tag includes a conductive layer in electrical communication (Continued)

System Block Diagram with the electromagnetic nonlinear element including a Schottky diode.

20 Claims, 28 Drawing Sheets

Related U.S. Application Data

(60) Provisional application No. 63/364,424, filed on May 10, 2022.

(56) References Cited

U.S. PATENT DOCUMENTS

| | | | | |
|---|---|---|---|---|
| 5,910,057 | A * | 6/1999 | Quimby | A63B 24/0021 473/407 |
| 6,084,530 | A * | 7/2000 | Pidwerbetsky | G01S 13/825 342/51 |
| 6,908,404 | B1 * | 6/2005 | Gard | A63B 24/0021 473/407 |
| 7,207,902 | B1 * | 4/2007 | Hamlin | A63B 24/0021 473/353 |
| 2002/0177490 | A1 * | 11/2002 | Yong | A63B 24/0021 473/353 |
| 2004/0058749 | A1 * | 3/2004 | Pirritano | A63B 24/0021 473/353 |
| 2005/0070375 | A1 * | 3/2005 | Savarese | A63B 24/0021 473/353 |
| 2006/0128503 | A1 * | 6/2006 | Savarese | A63B 24/0021 473/353 |

OTHER PUBLICATIONS

B.J. Xiang et al, "Wideband Circularly Polarized Dielectric Resonator Antenna With Bandpass Filtering and Wide Harmonics Suppression Response"; IEEE Transactions on Antennas and Propagation; vol. 65, No. 4; Apr. 2017; pp. 2096-2101; published by IEEE, Piscataway, New Jersey, USA. (Year: 2017).*

* cited by examiner

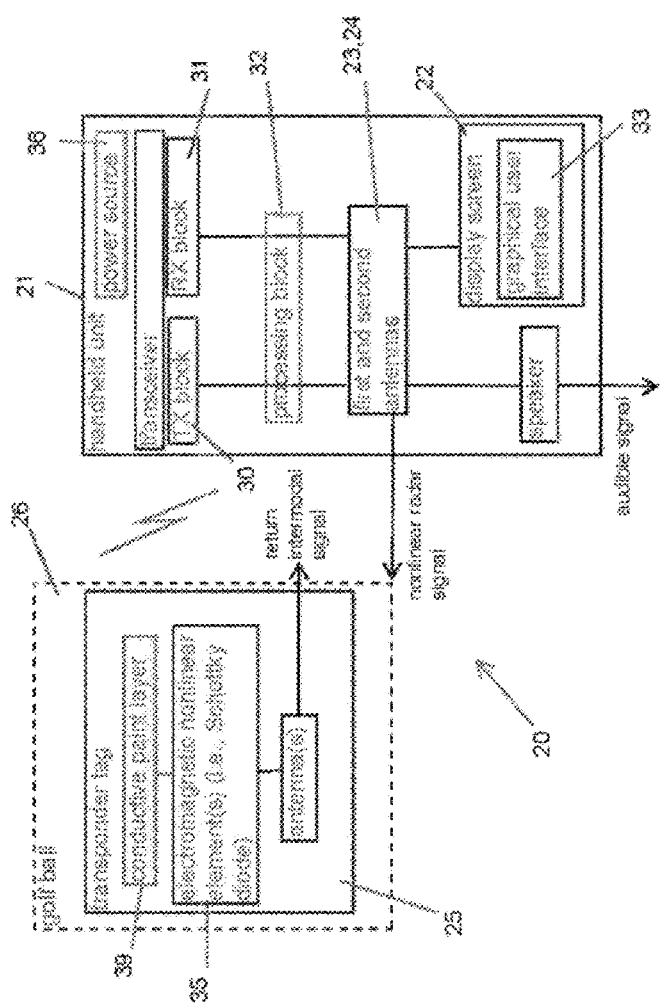
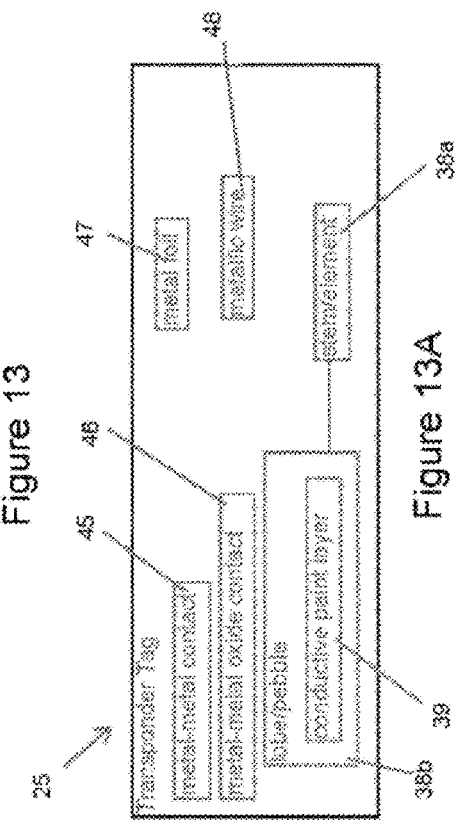
Figure 13
Figure 13A

Harmonic radar with frequency $f_0$ transmitted and frequency $2f_0$ returned by the nonlinear tag.

Intermodulation radar with frequency $f_1$ transmitted and frequency $2f_1 - f_2$ and $2f_2 - f_1$ returned by the nonlinear tag.

GOLF BALL LOCATING NONLINEAR RADAR SYSTEM EMPLOYING A SNOWFLAKE NONLINEAR PASSIVE TAG AND ASSOCIATED METHOD(S)

CROSS REFERENCE TO RELATED APPLICATIONS

This is a continuation-in-part application of U.S. non-provisional patent application Ser. No. 18/315,097, filed May 10, 2023, now U.S. Pat. No. 11,892,537, which claims priority to and benefit of U.S. provisional patent application No. 63/364,424 filed May 10, 2022, which are both incorporated by reference herein in their entireties.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND

Technical Field

Exemplary embodiment(s) of the present disclosure relate to golf ball locating devices and, more particularly, to a specially configured golf ball locating system that is able to detect and locate a golf ball that is not within a user's line of sight. In particular, the golf ball locating system employs at least one snowflake nonlinear passive transponder tag, which is much smaller in size, lighter in weight, and requires less material to fabricate, compared with conventional RFID (radio frequency identification) tags.

Prior Art

It is a common occurrence for a golf player to lose one or more golf balls during play. The player may lose sight of the ball when it is airborne due to light or weather conditions, lack of normal visual acuity, inattention, or because the ball came to rest in tall grass, under leaves, in or behind trees, brush, or undergrowth, rocks, or man-made structures. The ball may also bounce off of a hard surface, such as a rock, cart path, tree, or slope, or may roll down hill and come to rest in a place out of the player's view. Such occurrences typically happen on the tee shot, generally the longest shot on any hole.

While the ball is often located when the golfer arrives at the estimated ball location or after a short search, golfers are occasionally unable to find the ball. If the ball cannot be located in a reasonable amount of time (determined by the sanctioning authority), the ball is "lost" and must be replaced by a substitute ball. If the ball cannot be located, the golfer will suffer the penalty imposed by the rules as well as the cost of replacing the ball with a substitute. Even under relaxed rules, common in recreational golf where a strict time limit may not be enforced, the time taken in looking for the ball can be frustrating and reduce the enjoyment of the game for the player, those in his group, and those in following groups.

There have been a number of techniques advanced to aid the golfer in finding lost golf balls. Special glasses and cell phone camera apps can be used to enhance the contrast between the ball and its surroundings. These devices require some portion of the ball be in the line of sight. A ball in tall grass, bush, behind a tree or rock, or obscured by leaves may not be detectable by such means.

Another technique uses an RFID system with an active RFID tag embedded in the ball. In this case, the RFID tag would require a battery and be too heavy or bulky to be affixed to the surface or be inserted into the ball post manufacture. In addition, at some point the battery will become weakened and the utility of the tag lost unless a means of recharging the battery is introduced into ball. An on/off switch could be placed into the ball but would again require some extra circuitry.

A passive RFID tag might be used but seems impractical. Very small tags, which could be attached to the ball surface have very limited detection ranges, typically inches or less. Larger tags, with detection ranges of several feet could be used. Those tags would be too large to be affixed to the surface of the ball, since they could affect ball performance characteristics. They could be placed in the ball interior during the manufacturing process.

Conventional systems utilizing GPS in combination with a cell phone and software application, or dedicated handheld unit have also been proposed. In each case, a relatively bulky and heavy, battery powered device would necessarily be built into the ball during its manufacture to ensure the presence of the conventional GPS or conventional RFID circuit would not affect the flight or balance of the ball.

It is unlikely that ball makers would want to construct their golf balls around the aforementioned conventional GPS or aforementioned conventional RFID devices which would add to the manufacturing difficulty and cost, and could reduce the number of replacement balls they would manufacture. A ball specifically manufactured with the aforementioned conventional embedded device would likely be more expensive than the same ball without the device or than the untagged products of rival ball makers. Additionally, many golfers have a preferred brand and may not abandon it for another, tagged brand.

Lost golf ball locating systems have also been proposed that are based on radar or microwave detection with or without enhanced reflection. The ball reflection would not likely be separable from the background clutter without enhancement, and no system has shown sufficient enhancement to serve as the basis for a ball location device.

Notably, nonlinearity of diodes have been widely researched for designing nonlinear tags for object detection using harmonic and intermodulation radar systems. While the intermodulation radar system has the advantage of blocking unauthorized devices with broadband, the system requires two different frequencies input and multiple antennas with additional components. The corresponding size of the tag for the intermodulation radar system is bigger because it requires the full wavelength for the tag antenna of the transmitting frequency. Patch tags for intermodulation radar systems have no requirement for diodes; they need a larger footprint and a ground plane, increasing the tag weight. One common application is for human vital sign detection. RFID-based tags with patch and ring designs have high sensitivity and low power requirements; they require a sizeable footprint and may carry additional weight.

In addition, most naturally occurring objects present very little to no nonlinearity, so the second-order harmonics result in a clear detection and resolution on nonlinearly tagged objects. Furthermore, this nonlinear response can be easily distinguished from background noise, and these advantages were utilized in the nonlinear tag design for target and gesture tracking. However, tags made of metallic wires can easily suffer antenna deformation which, unless corrected, can cause the antenna to be ineffective in echoing at their designed operating frequencies.

Furthermore, the most common means of locating a difficult to find golf ball is enhanced visual contrast between the golf ball and its surroundings. Colored balls are made for that purpose, but many golfers do not want to use colored balls. The contrast can also be enhanced by employing a blue filter, to make a golf ball more visible. The filter may be tinted glass or an electronic filter used with a cell phone. In either case, golf ball must be in the line-of-sight of the user. A golf ball in tall grass, brush, behind trees, or covered by leaves might not be in sight of the golfer and enhanced contrast would be useless.

RFID, radio frequency identification, either active or passive, has also been attempted. RFID is similar in some ways to nonlinear radar in that the system uses a radio frequency signal to interrogate a tag which responds to a receiver. The primary uses of RFID is to transmit presence or information rather than location. These systems are used in retail settings to detect theft and in warehouses for inventory control. There are programmable and non-programmable tags. Active RFID requires the tag to include a power source—a battery. A battery would be too heavy and bulky to be on the ball surface. To avoid imparting performance characteristics, the battery/transponder tag would necessarily be located in the center of the ball: the ball would need to be built around the tag. An active tag would need to be powered for the length of the golf round—often several hours—or a means of turning the tag on and off included. A means of recharging the battery would also be required without which the tag battery would run down between uses. Such systems may require the tagged ball to be paired with the transceiver, which proved problematic and unpopular with golfers.

Passive RFID tags have a distinct advantage over active tags in not requiring a tag battery. If the tag is mounted on the surface of the ball, it would need to be very small to avoid affecting flight characteristics. Most very small, passive RFID tags operate over a very small range—a few feet or less.

Other systems utilizing GPS in combination with either a cell phone and software application or a dedicated handheld unit have also been attempted. In both cases, the relatively bulky and heavy battery powered device would necessarily be built into ball during its manufacture to ensure the GPS device would not interfere with the flight and balance of ball.

Furthermore, nonlinear radar is used to locate skiers buried by avalanches (RECCO) or for marine rescues, to track insects in flight or underground, and to locate and determine the activities of individuals in military applications. It has not been used for locating an object, such as a golf ball due to very demanding characteristics required for sports equipment—a passive, very small and lightweight tag that can be attached to the target surface without affecting flight characteristics used with a small, pocketable transceiver/display unit. The RECCO system uses a large passive tag, 0.5 in×2.0 in×0.05 in and a bulky and heavy (2 pound) hand held unit and operates at a range of about 90 yards in air or meters in packed snow.

The nonlinear radar systems used to monitor the migration and range of flying insects and small amphibians employ a small, lightweight, passive tag, often consisting of a diode and wire, so as not to impede movement. The wire antenna would impair the flight characteristics of a golf ball and the transceiver is generally bulky and heavy, like the RECCO device and operates at significant power required to track fauna at distances of hundreds of feet.

Nonlinear radar has also been studied for target location and movement information for military purposes. Though military targeting equipment using nonlinear radar may not be in use presently, the allowed or required power, size, and weight would likely be much higher than those for insect tracking or RECCO type devices. RECCO is used to find an object that is obscured from view by means of nonlinear radar. However, RECCO must use higher power to penetrate snow therefore requiring a larger, bulkier handheld unit and a larger tag.

The only other devices for locating golf balls are either optical (enhanced contrast), require a battery powered tag be built in the center of the ball (GPS or active RFID based), or a large tag on the outside of the ball (passive RFID). There are "telemetry" systems which gather data on the golf ball trajectory and spin but cannot locate a ball on the ground or obscured by grass, brush, or leaves.

Accordingly, a need remains for a specially configured golf ball locating system to overcome at least one of the above-noted shortcomings. The exemplary embodiment(s) satisfy such a need by a golf ball locating system that is convenient and easy to use, lightweight yet durable in design, versatile in its applications, and configured to employ a non-linear radar that is able to detect and located a golf ball that is not within a user's line of sight. In particular, the golf ball locating system employs at least one snowflake nonlinear passive tag, which is much smaller in size, lighter in weight, and requires less material to fabricate, compared with conventional RFID tags.

BRIEF SUMMARY OF NON-LIMITING EXEMPLARY EMBODIMENT(S) OF THE PRESENT DISCLOSURE

In view of the foregoing background, it is therefore an object of the non-limiting exemplary embodiment(s) to provide a specially configured golf ball locating system that can detect and locate a golf ball that is not within a user's line of sight. In particular, the golf ball locating system employs at least one snowflake nonlinear passive transponder tag, which is much smaller in size, lighter in weight, and requires less material to fabricate, compared with conventional RFID tags. These and other objects, features, and advantages of the non-limiting exemplary embodiment(s) are provided by a nonlinear radar system including a transponder tag attached to an existing portable object. Such a transponder tag is in communication with and responsive to an incident signal having a first frequency wherein the transponder tag includes an electromagnetic nonlinear element configured to be detected by the incident signal. Advantageously, upon being detected by the incident signal, the transponder tag is configured to transmit a reflected return harmonic signal having a second frequency different from the first frequency. Advantageously, the transponder tag includes a plurality of stems, and a plurality of lobes coupled to distal ends of the stems, respectively. Advantageously, a quantity of the stems equals a quantity of the lobes and have a 1:1 ratio.

In a non-limiting exemplary embodiment, the transponder tag includes a snowflake shape having a center and the stems are radially extended from the center. Advantageously, the electromagnetic nonlinear element is located at said snowflake shape.

In a non-limiting exemplary embodiment, each of the lobes includes a conductive layer in electrical communication with the electromagnetic nonlinear element, respectively. Non-limiting examples of the conductive layer can be realized in a variety of manners such as a printed circuit board technology or conductive paint.

In a non-limiting exemplary embodiment, each of the lobes emits a unique one of the reflected return harmonic signal.

The present disclosure further includes a nonlinear radar system including a transponder tag attached to an existing portable object. Such a transponder tag is in communication with and responsive to an incident signal having a first frequency. Advantageously, transponder tag includes an electromagnetic nonlinear element being configured to be detected by the incident signal. Advantageously, upon being detected by the incident signal, the transponder tag is configured to transmit a reflected return harmonic signal having a second frequency different from the first frequency. Advantageously, the transponder tag is passive and does not require a power source other than incident radiation. Advantageously, the transponder tag includes a snowflake shape, wherein the electromagnetic nonlinear element is located at the snowflake shape.

In a non-limiting exemplary embodiment, the transponder tag includes a plurality of stems radially extended outwardly from a center of the transponder tag; and a plurality of lobes coupled to a distal end of the stems, respectively. Advantageously, a quantity of the stems equals a quantity of the lobes and have a 1:1 ratio.

In a non-limiting exemplary embodiment, the snowflake shape includes a center and a plurality of stems radially extended from the center. Advantageously, wherein the electromagnetic nonlinear element is disposed at the snowflake shape.

In a non-limiting exemplary embodiment, each of the lobes includes a conductive layer in electrical communication with the electromagnetic nonlinear element, respectively.

In a non-limiting exemplary embodiment, each of the lobes emits a unique one of the reflected return harmonic signal.

The present disclosure further includes a nonlinear radar system including a first antenna configured to generate and emit an incident signal having a first frequency, a transponder tag attached to an existing portable object, wherein the transponder tag includes an electromagnetic nonlinear element configured to be detected by the incident signal. Advantageously, upon being detected by the incident signal, the transponder tag is configured to transmit a reflected return harmonic signal having a second frequency different from the first frequency, wherein the reflected return harmonic signal is an on-off keying (OOK) signal. A second antenna is configured to receive the reflected return harmonic signal having the second frequency. Advantageously, the transponder tag includes a conductive layer in electrical communication with the electromagnetic nonlinear element, wherein the electromagnetic nonlinear element includes a Schottky diode.

In a non-limiting exemplary embodiment, system further includes a handheld unit including a display screen, a transmitting block in communication with the electromagnetic nonlinear element for generating and transmitting the incident signal within civilian-use-permitted frequency bands and at a power of about one watt, a receiving block in communication with the electromagnetic nonlinear element for receiving and processing the reflected return harmonic signal, and a processing block configured to determine a signal strength of the reflected return harmonic signal and illustrate on the display screen a distance from the existing portable object to the handheld unit.

In a non-limiting exemplary embodiment, the handheld unit is configured to radiate at two or more unique frequencies and further configured to receive at least one of the reflected return harmonic signal generated by the electromagnetic nonlinear element.

In a non-limiting exemplary embodiment, the transponder tag is disposed at the existing portable object.

In a non-limiting exemplary embodiment, the transponder tag is disposed on a surface of the existing portable object.

In a non-limiting exemplary embodiment, transponder tag includes a plurality of stems radially extended outwardly from a center of the transponder tag, and a plurality of lobes coupled to a distal end of the stems, respectively. Advantageously, a quantity of the stems equals a quantity of the lobes and have a 1:1 ratio.

In a non-limiting exemplary embodiment, the transponder tag includes a snowflake shape having a center and a plurality of stems radially extended from the center. Advantageously, the electromagnetic nonlinear element is located at the snowflake shape.

In a non-limiting exemplary embodiment, each of the lobes includes a conductive layer in electrical communication with the electromagnetic nonlinear element, respectively.

In a non-limiting exemplary embodiment, each of the lobes emits a unique one of the reflected return harmonic signal.

In a non-limiting exemplary embodiment, each reflected return harmonic signal is configured to be detected by the receiving block and analyzed by the processing block to determine the distance and a direction from the existing portable object to the handheld unit.

There has thus been outlined, rather broadly, the more important features of non-limiting exemplary embodiment(s) of the present disclosure so that the following detailed description may be better understood, and that the present contribution to the relevant art(s) may be better appreciated. There are additional features of the non-limiting exemplary embodiment(s) of the present disclosure that will be described hereinafter and which will form the subject matter of the claims appended hereto.

BRIEF DESCRIPTION OF THE NON-LIMITING EXEMPLARY DRAWINGS

The novel features believed to be characteristic of non-limiting exemplary embodiment(s) of the present disclosure are set forth with particularity in the appended claims. The non-limiting exemplary embodiment(s) of the present disclosure itself, however, both as to its organization and method of operation, together with further objects and advantages thereof, may best be understood by reference to the following description taken in connection with the accompanying drawings in which:

FIG. 13 is a high level schematic block diagram illustrating the interrelationship between the major electronic components of the present disclosure, in accordance with a non-limiting exemplary embodiment of the present disclosure;

FIG. 13A is a high level schematic block diagram illustrating the interrelationship between selected major electronic components of a transponder tag, in accordance with a non-limiting exemplary embodiment of the present disclosure;

Figure 22:
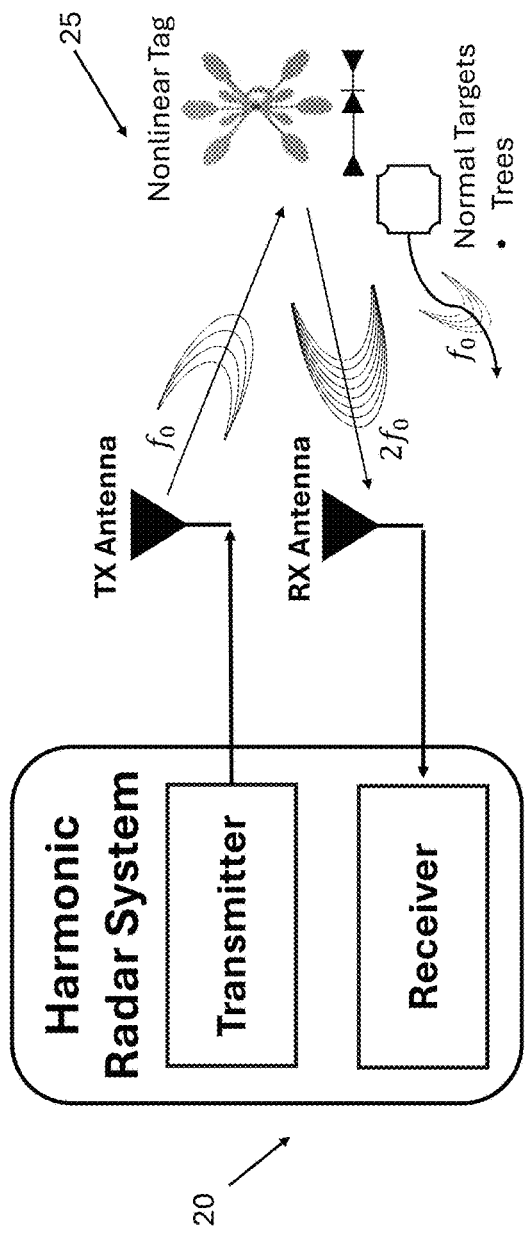
Figure 23:
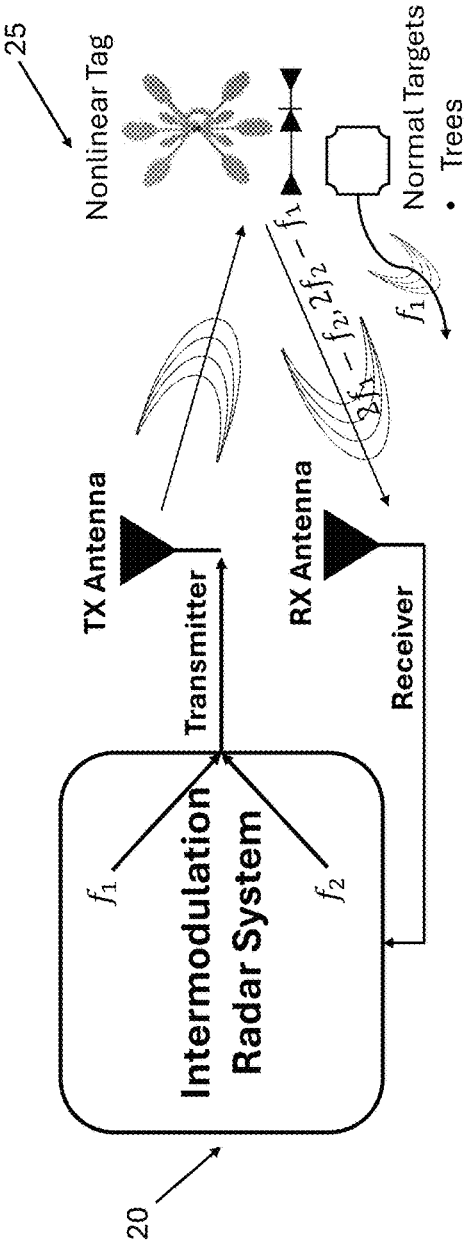

FIG. 22 is a schematic block diagram illustrating the interrelationships between select electronic components that provide a harmonic radar having a transmitted frequency $f0$ and a frequency $2f0$ returned by the nonlinear tag, in accordance with a non-limiting exemplary embodiment of the present disclosure; and FIG. 23 is another schematic block diagram illustrating the interrelationships between select electronic components that provide an intermodulation radar having transmitted frequencies $f1$ and $f2$ and frequencies $2f1\text{-}f2$ and $2f2\text{-}f1$ returned by the nonlinear tag, in accordance with a non-limiting exemplary embodiment of the present disclosure.

Those skilled in the art will appreciate that the figures are not intended to be drawn to any particular scale; nor are the figures intended to illustrate every non-limiting exemplary embodiment(s) of the present disclosure. The present disclosure is not limited to any particular non-limiting exemplary embodiment(s) depicted in the figures nor the shapes, relative sizes or proportions shown in the figures.

DETAILED DESCRIPTION OF NON-LIMITING EXEMPLARY EMBODIMENT(S) OF THE PRESENT DISCLOSURE

The present disclosure will now be described more fully hereinafter with reference to the accompanying drawings, in which non-limiting exemplary embodiment(s) of the present disclosure is shown. The present disclosure may, however, be embodied in many different forms and should not be construed as limited to the non-limiting exemplary embodiment(s) set forth herein. Rather, such non-limiting exemplary embodiment(s) are provided so that this application will be thorough and complete, and will fully convey the true spirit and scope of the present disclosure to those skilled in the relevant art(s). Like numbers refer to like elements throughout the figures.

The illustrations of the non-limiting exemplary embodiment(s) described herein are intended to provide a general understanding of the structure of the present disclosure. The illustrations are not intended to serve as a complete description of all of the elements and features of the structures, systems and/or methods described herein. Other non-limiting exemplary embodiment(s) may be apparent to those of ordinary skill in the relevant art(s) upon reviewing the disclosure. Other non-limiting exemplary embodiment(s) may be utilized and derived from the disclosure such that structural, logical substitutions and changes may be made without departing from the true spirit and scope of the present disclosure. Additionally, the illustrations are merely representational and are to be regarded as illustrative rather than restrictive.

One or more embodiment(s) of the disclosure may be referred to herein, individually and/or collectively, by the term "non-limiting exemplary embodiment(s)" merely for convenience and without intending to voluntarily limit the true spirit and scope of this application to any particular non-limiting exemplary embodiment(s) or inventive concept. Moreover, although specific embodiment(s) have been illustrated and described herein, it should be appreciated that any subsequent arrangement designed to achieve the same or similar purpose may be substituted for the specific embodiment(s) shown. This disclosure is intended to cover any and all subsequent adaptations or variations of other embodiment(s). Combinations of the above embodiment(s), and other embodiment(s) not specifically described herein, will be apparent to those of skill in the relevant art(s) upon reviewing the description.

References in the specification to "one embodiment(s)", "an embodiment(s)", "a preferred embodiment(s)", "an alternative embodiment(s)" and similar phrases mean that a particular feature, structure, or characteristic described in connection with the embodiment(s) is included in at least an embodiment(s) of the non-limiting exemplary embodiment(s). The appearances of the phrase "non-limiting exemplary embodiment" in various places in the specification are not necessarily all meant to refer to the same embodiment(s).

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiment(s) and are not necessarily intended to be construed as limiting.

If used herein, "about," "generally," and "approximately" mean nearly and in the context of a numerical value or range set forth means ±15% of the numerical.

If used herein, "substantially" means largely if not wholly that which is specified, but so close that the difference is insignificant.

The terms "stem," "element," and variations thereof are interchangeably used throughout the present disclosure.

The terms "lobe," "pebbles," and variations thereof are interchangeably used throughout the present disclosure.

The terms "transmitting antenna," "TX antenna," "first antenna," and variations thereof are interchangeably used throughout the present disclosure.

The terms "receiving antenna," "RX antenna," "second antenna," and variations thereof are interchangeably used throughout the present disclosure.

The term "element" includes at least one stem and at least one lobe/pebble.

Non-limiting exemplary embodiment(s) of the present disclosure is referred to generally in FIGS. 1-23 and are intended to provide a specially configured golf ball locating nonlinear radar system 20 that is able to detect and locate a golf ball 26 that is not within a user's line of sight. It should be understood that the exemplary embodiment(s) may be used to locate a variety of objects (archery arrows, tennis balls, etc.) and should not be limited to any particular object described herein.

Advantageously, the present disclosure includes use of nonlinear passive tags 25 for location detection using harmonic radar for objection detection. The nonlinear passive tags 25 provide a second-order harmonic system 20 with various antenna configurations. The tag's antennas 23, 24 were fabricated with laser-cut pattern masks and conductive materials, and their performance was greatly enhanced by the multi-element 28 design and Schottky diode 35 nonlinearity. The detective distance of up to approximately 8.0 meters of the tags 25 (tag 25+golf ball 26) was tested using a benchtop setup having a 7.9 GHz transmitter and a 15.8 GHz receiver antenna without any signal amplification. The lightweight and miniature tags 25 have great potential for extensive applications in locating objects.

In a non-limiting exemplary embodiment, during experimental testing, a detection range of up to approximately 8.0 meters was achieved when the tags 25 were placed inside golf balls 26. In such a case, the tags 25 took the lensing effect, enhancing the overall performance and increasing the detection range.

In a non-limiting exemplary embodiment, when the tags 25 were tested by themselves, without golf balls 26, the detection range was up to approximately 6.7 feet (2.05 meters).

In a non-limiting exemplary embodiment, the nonlinear radar system 20 for finding a golf ball 26 employs lightweight miniature multi-element snowflake-shaped nonlinear passive tags 25 for wireless tracking. A hand held unit 21 is in communication with a transponder tag 25 (snowflake 40 nonlinear passive tag 25) for object location. In particular, the present disclosure provides a passive nonlinear tag 25 structural configuration with a novel snowflake 40 pattern and fabrication method. The snowflake tag 25 is very light weight and cost effective. It can be used as a battery-less tracker to be tracked by a harmonic radar. The tag antennas 23, 24 were fabricated with laser-cut pattern masks and conductive materials, and their performance was greatly enhanced by the multi-element 28 snowflake 40 patterned design. The detective distance of up to approximately 8.0 meters of tag 25 (tag 25+golf ball 26) was tested using a benchtop setup of a 7.9 GHz transmitter and a 15.8 GHz receiver antenna without any battery or signal amplification on the tag 25 side. The lightweight and miniature tags 25 have great potential for extensive applications in locating objects.

Referring again to FIGS. 1-23, the nonlinear radar system 20 includes a handheld unit 21 including a display screen 22, a first antenna 23 configured to generate and emit an incident signal having a first frequency, and a second antenna 24 configured to receive a reflected return harmonic signal having a second frequency. A transponder tag 25 is attached to an existing golf ball 26. Such a transponder tag 25 is in communication with and responsive to the handheld unit 21, and includes an electromagnetic nonlinear element 28 configured to be detected by the incident signal transmitted from the hand held unit 21. Advantageously, upon being detected by the incident signal, the transponder tag 25 is configured to transmit the reflected return harmonic signal having the second frequency different from the first frequency. Advantageously, the transponder tag 25 is passive and does not require a power source 36 other than incident radiation;

Advantageously, the handheld unit 21 further includes a transmitting block 30 in communication with the electromagnetic nonlinear element 28 and configured for generating and transmitting the incident signal within civilian-use-permitted frequency bands and at a power of about one watt, a receiving block 31 in communication with the electromagnetic nonlinear element 28 and configured for receiving and processing the reflected return harmonic signal, and a processing block 32 configured to determine a signal strength of the reflected return harmonic signal and illustrate on the display screen 22 a distance from the existing golf ball 26 to the handheld unit 21.

In a non-limiting exemplary embodiment, the handheld unit 21 includes a graphical user interface 33 illustrated on display screen 22. Such a graphical user interface 33 is configured to graphically display the distance and a direction from the existing golf ball 26 to the handheld unit 21 as well as the signal strength of the reflected return harmonic signal.

In a non-limiting exemplary embodiment, the electromagnetic nonlinear element 28 is a Schottky diode 35.

In a non-limiting exemplary embodiment, the handheld unit 21 is configured to radiate at two or more unique frequencies and further configured to receive at least one of the reflected return harmonic signal generated by the electromagnetic nonlinear element 28.

In a non-limiting exemplary embodiment, the transponder tag 25 is disposed at the existing golf ball 26.

In a non-limiting exemplary embodiment, the transponder tag 25 is disposed on a surface of the existing golf ball 26.

In a non-limiting exemplary embodiment, the transponder tag 25 is integral and congruous with the existing golf ball 26.

In a non-limiting exemplary embodiment, the transponder tag 25 is applied (e.g., painted, adhesively affixed, embedded, impregnated, etc.) on the surface of the existing ball 26 with metallic and/or conductive material.

In a non-limiting exemplary embodiment, the transponder tag 25 may be placed on an inner sphere (under an outer sphere cover) of the golf ball 26. The harmonic signal penetrates the outer sphere cover effectively.

In a non-limiting exemplary embodiment, each of the first antenna 23 and the second antenna 24 is a fractal antenna.

In a non-limiting exemplary embodiment, the handheld unit 21 is configured to generate and emit at least one audible signal associated with the distance and/or direction from the existing golf ball 26 to the handheld unit 21 to indicate the signal strength of the reflected return harmonic signal as well as a direction from the handheld unit 21 to the existing golf ball 26.

In a non-limiting exemplary embodiment, the handheld unit 21 further includes a power source 36 selected from a group including a rechargeable battery and a solar array.

In a non-limiting exemplary embodiment, the electromagnetic nonlinear element 28 includes at least one of a metal-metal contact 45 and a metal-metal oxide contact 46.

In a non-limiting exemplary embodiment, the transponder tag 25 includes one of a metal foil 47 and a metallic wire 48.

In a non-limiting exemplary embodiment, the first antenna 23 is solely a transmitting antenna.

In a non-limiting exemplary embodiment, the second antenna 24 is solely a receiving antenna.

In a non-limiting exemplary embodiment, the transponder tag 25 includes a conductive layer 39 in electrical communication with the electromagnetic nonlinear element 28. Advantageously, the electromagnetic nonlinear element 28 includes a Schottky diode 35.

In a non-limiting exemplary embodiment, transponder tag 25 includes a snowflake 40 shape having a center 40a and a plurality of stems 38a radially extended from the center 40a. Advantageously, a plurality of lobes (pebbles) 38b are attached to distal ends of the stems 38a and may include the electromagnetic nonlinear element 28 spaced apart along an outer perimeter of the snowflake 40 shape. The shapes and sizes of the pebbles 38b, length and quantity of the stems 38a, and angles of the stems 38a relative to each other from the center 40a of the snowflake 40 shape help determine the effectiveness of transponder tag 25.

In a non-limiting exemplary embodiment, each of the lobes 38b includes a conductive layer 39 in electrical communication with the electromagnetic nonlinear element 28, respectively.

In a non-limiting exemplary embodiment, each of the lobes 38b emits a unique one of the reflected return harmonic signal.

In a non-limiting exemplary embodiment, each the reflected return harmonic signal is configured to be detected by the receiving block 31 and analyzed by the processing block 32 to determine the distance and a direction (angle) from the existing golf ball 26 to the handheld unit 21.

In a non-limiting exemplary embodiment, the small and lightweight tag 25 could be easily applied to various subjects for location detection and finding tagged objects concealed/blocked by clutters. The tag 25 does not require any power supply, complex integrated chip, or battery. It is completely passive and very cost effective.

In a non-limiting exemplary embodiment, the present disclosure describes a novel design and fabrication of nonlinear tags 25 with conductive material and a Schottky diode 35. The tag antennas 23, 24 were designed to cover the frequencies 7.9 GHz and 15.8 GHz at transmitter 23 and receiver 24 antennas. Various configurations with multiple antenna elements and parameters were developed, fabricated, and tested. The test bench setup did not use any amplifiers; the transmitting and receiving antennas 23, 24 were directly connected to the lab measuring equipment, shown in FIG. 5.

In a non-limiting exemplary embodiment, in harmonic configurations, a fundamental frequency $f_1$ is transmitted by the transmitting antenna 23, and the receiving antenna 24 collects an integer-order harmonic frequency $f_2$ of the fundamental. For instance, a second-order harmonic would have a fundamental frequency at $f_1$, and receiving frequency of $f_2=2\times f_1$. At the $n^{th}$ order harmonics, the receiving frequency $f_2$ will be $n\times f_1$, where n is an integer.

In a non-limiting exemplary embodiment, the present disclosure focuses on the second-order harmonic tag 25 design with a fundamental frequency of 7.9 GHz and receiving frequency of 15.8 GHz.

Figure 1:
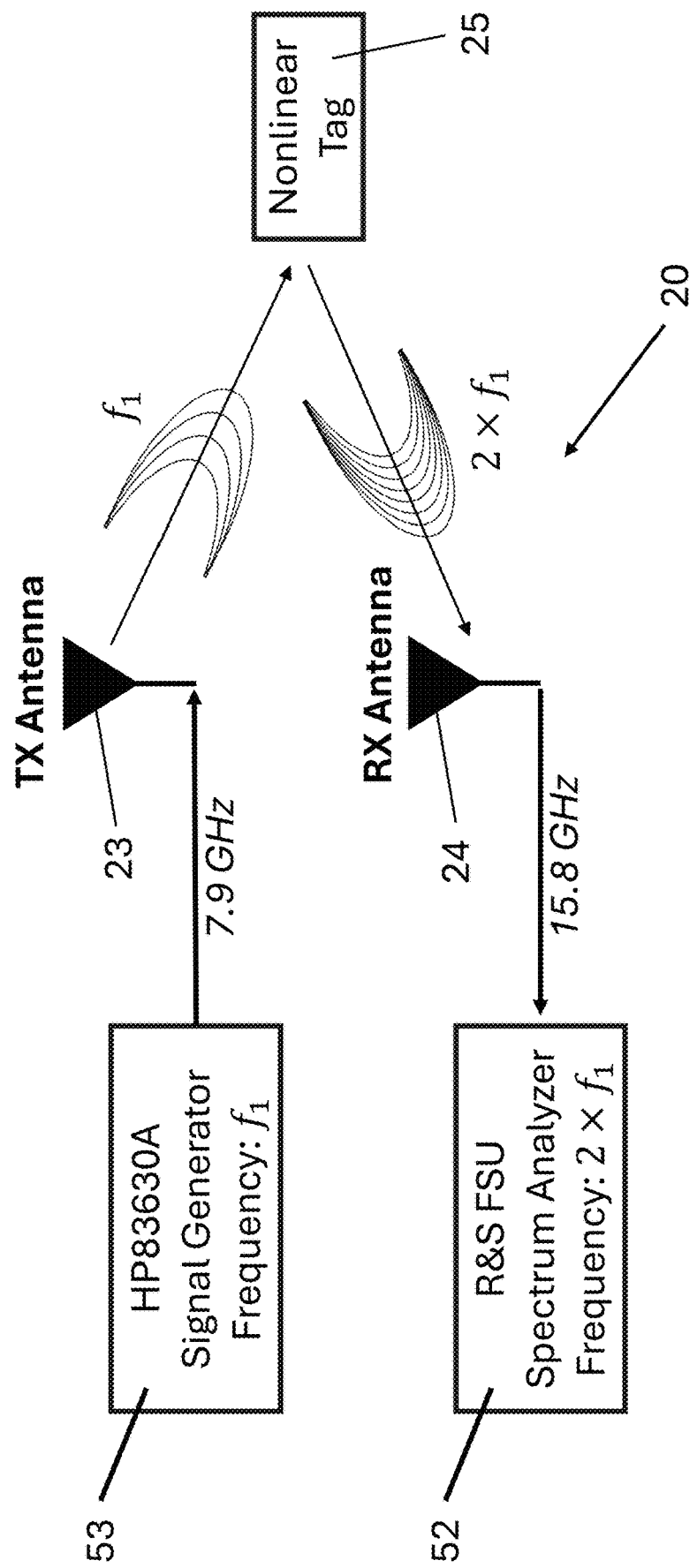
FIG. 1 is a schematic diagram illustrating the interrelationship between some of the major components of a harmonic radar system, using benchtop equipment with a transmitting (TX) frequency of f_1 and a receiving (RX) frequency of 2×f_1, in accordance with a non-limiting exemplary embodiment of the present disclosure.
Figure 8:
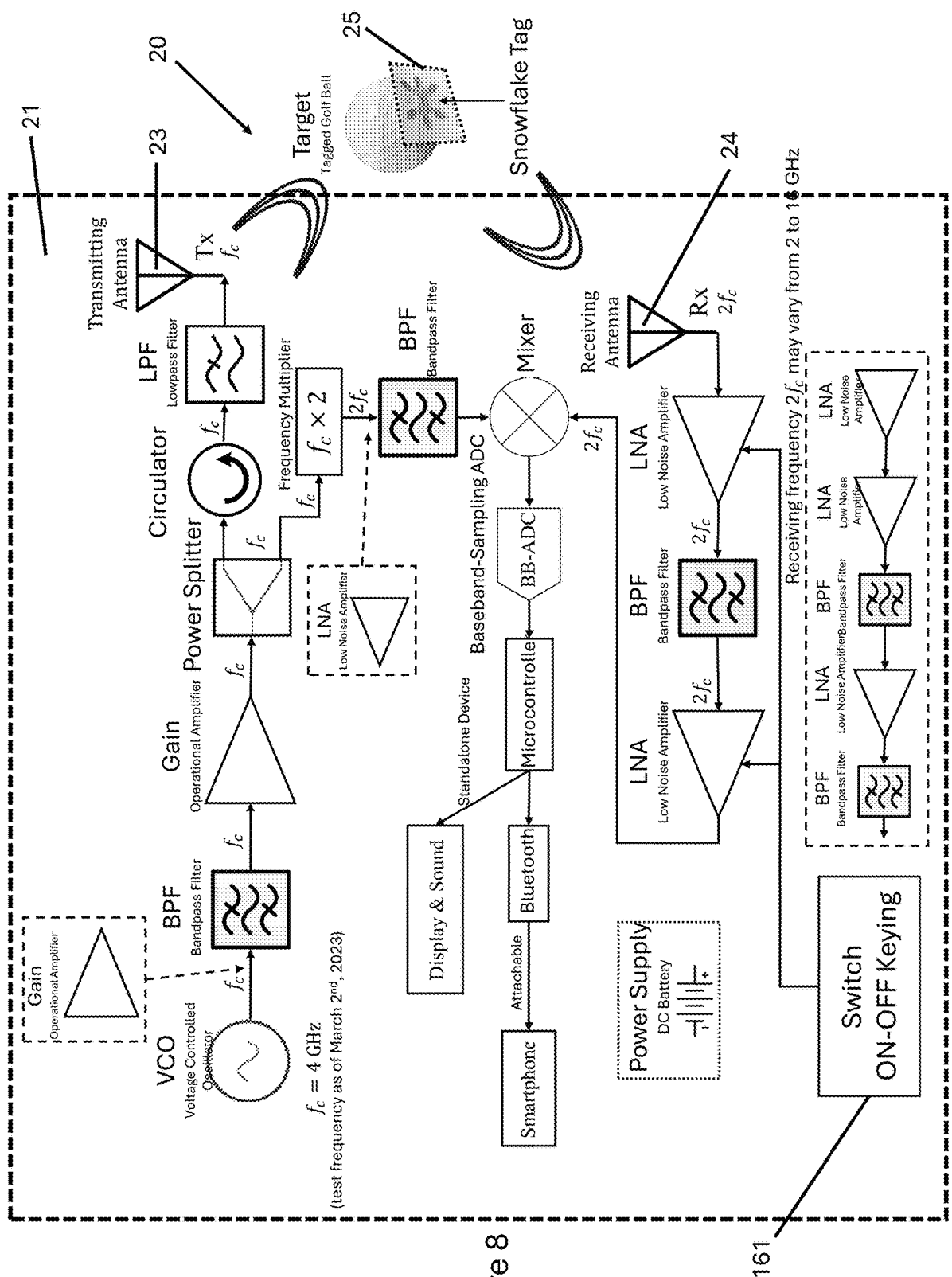
FIG. 8 is a block diagram illustrating the interrelationship between the major electronic components of the present disclosure having exemplary operating parameters, with any necessary adjustments and changes to the required components as illustrated in dashed boxes, in accordance with a non-limiting exemplary embodiment of the present disclosure.
Figure 9:
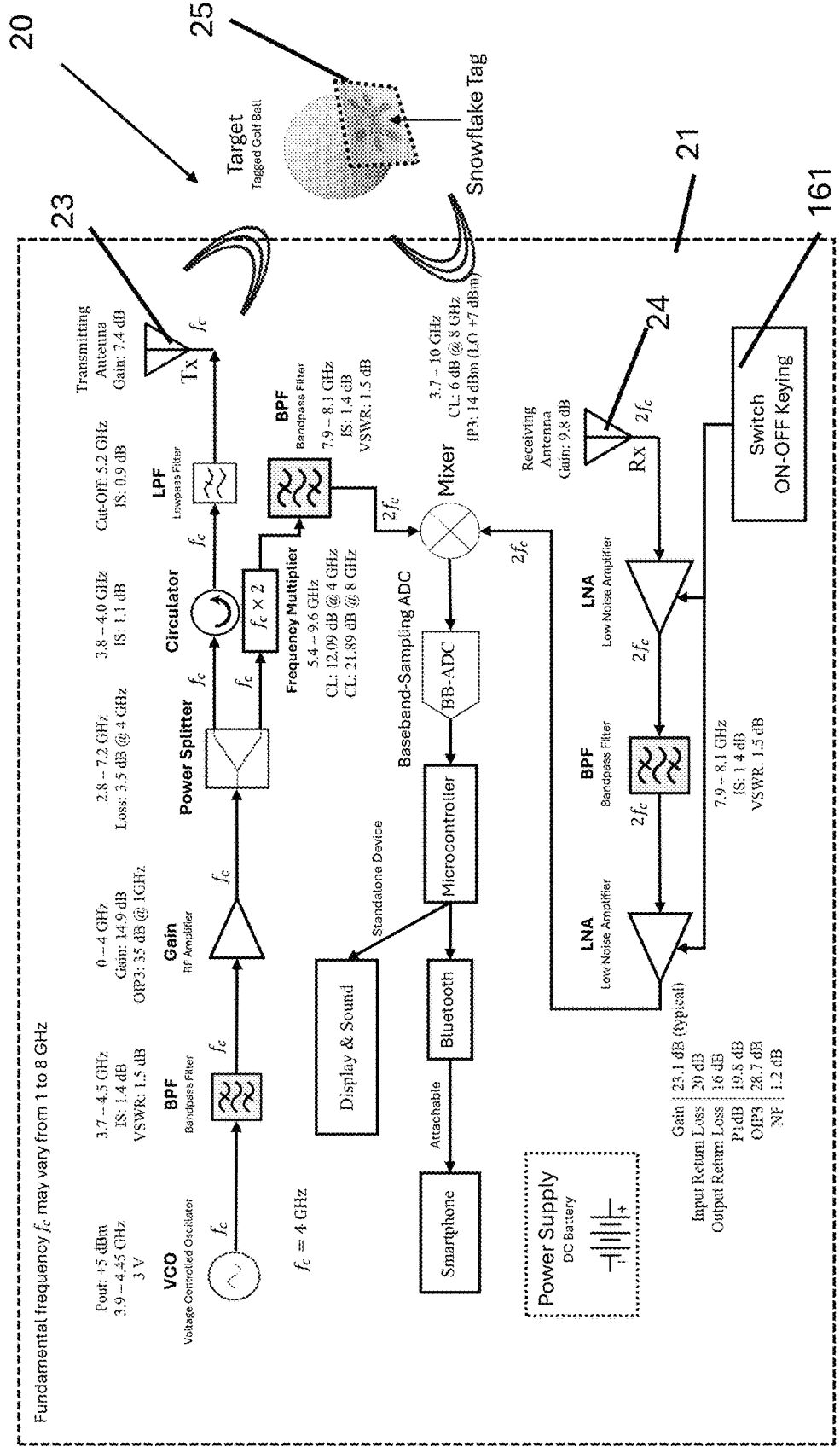
FIG. 9 is another block diagram illustrating the interrelationship between the major electronic components of the present disclosure with operating parameters, in accordance with a non-limiting exemplary embodiment of the present disclosure.

In a non-limiting exemplary embodiment, the design parameters of the tag antennas 23, 24 are based on the fundamental frequencies. Therefore, the lengths of the antennas 23, 24 are designed based on the wavelength of the transmitting and receiving frequencies: the wavelengths $\lambda$ can be calculated with $\lambda=c/f$, where c is the speed of light, and $f$ is the frequency. In some cases, the wavelength design parameters were determined by the ratio of the fundamental frequency $\lambda_1$, and the common ratios are $l=0.5\lambda_1$ and $l=0.6\lambda_1$, where l is the total length of the antenna. The corresponding antenna lengths have $2l_1=l_2$ relationship. The two-element antenna design is shown in FIGS. 1, 8, and 9.

In a non-limiting exemplary embodiment, the experiment was conducted with different design parameters of the antenna lengths l with $0.4\lambda_1$, $0.45\lambda_1$, $0.5\lambda_1$, $0.55\lambda_1$ and $0.6\lambda_1$, accounting for the gap 50 length of the diode of 0.4 to 0.5 mm, along with varying widths from 0.1 mm to 0.4 mm at 0.1 mm increments. With all the parameter variations tested, it was found that strictly following the transmitting and receiving frequencies at their quarter wavelengths gave the best results for this application. While experimenting with different antenna parameter designs, it was found that tags 25 with more extended elements, i.e., $0.7\lambda_1$ to $2\lambda_1$ would still provide a decent signal-to-noise ratio (SNR), the extended element tags 25 could not match the performance of the tags 25 designed based on the quarter-wave lengths.

In a non-limiting exemplary embodiment, a multi-element 28 (multiple stems 38a and lobes 38b) configuration was developed to enhance the reflected signal strength at the same distance while significantly increasing the detection range of a single-element 28 design. And further modulations on the multi-element 28 structure considerably boosted the reflected signal strength and the detectable distance.

Figure 2:
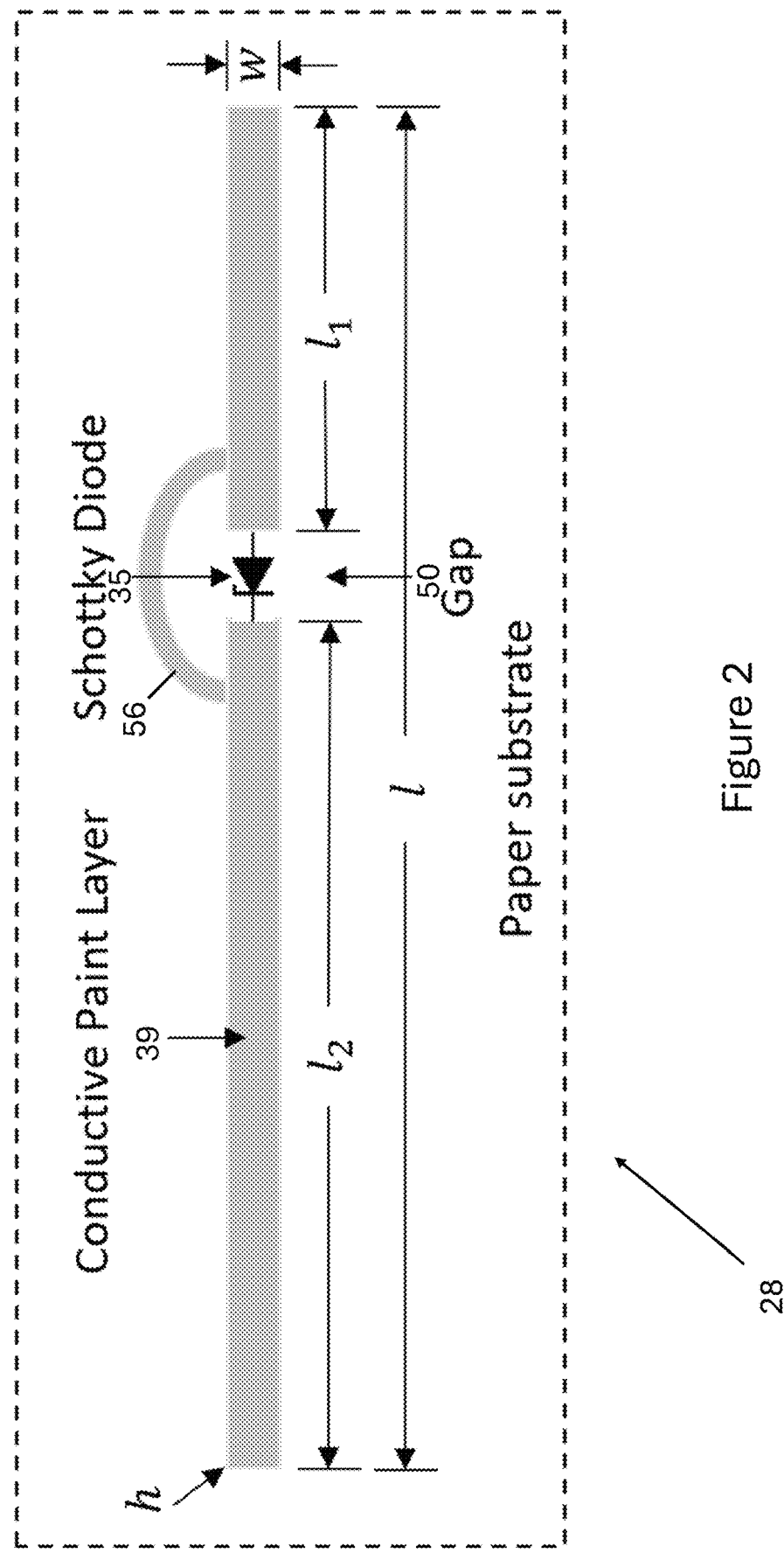
FIG. 2 is a single-element antenna structural configuration of the non-linear radar system, in accordance with a non-limiting exemplary embodiment of the present disclosure.
Figure 4A:
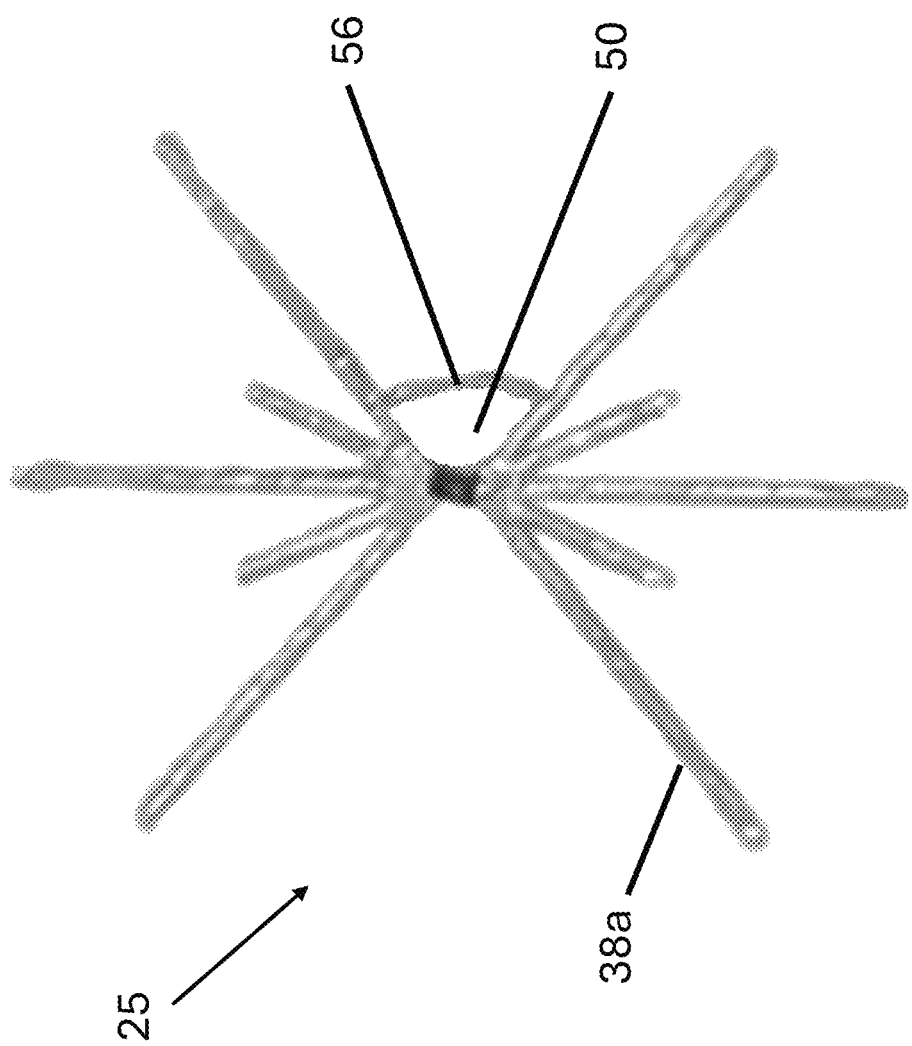
FIG. 4A is a top plan view of a multi-element snowflake nonlinear passive tag, in accordance with a non-limiting exemplary embodiment of the present disclosure.
Figure 4B:
FIG. 4B is a side elevational view of a single-element snowflake nonlinear passive tag positioned next to a U.S. coin (quarter), in accordance with a non-limiting exemplary embodiment of the present disclosure.
Figure 4C:
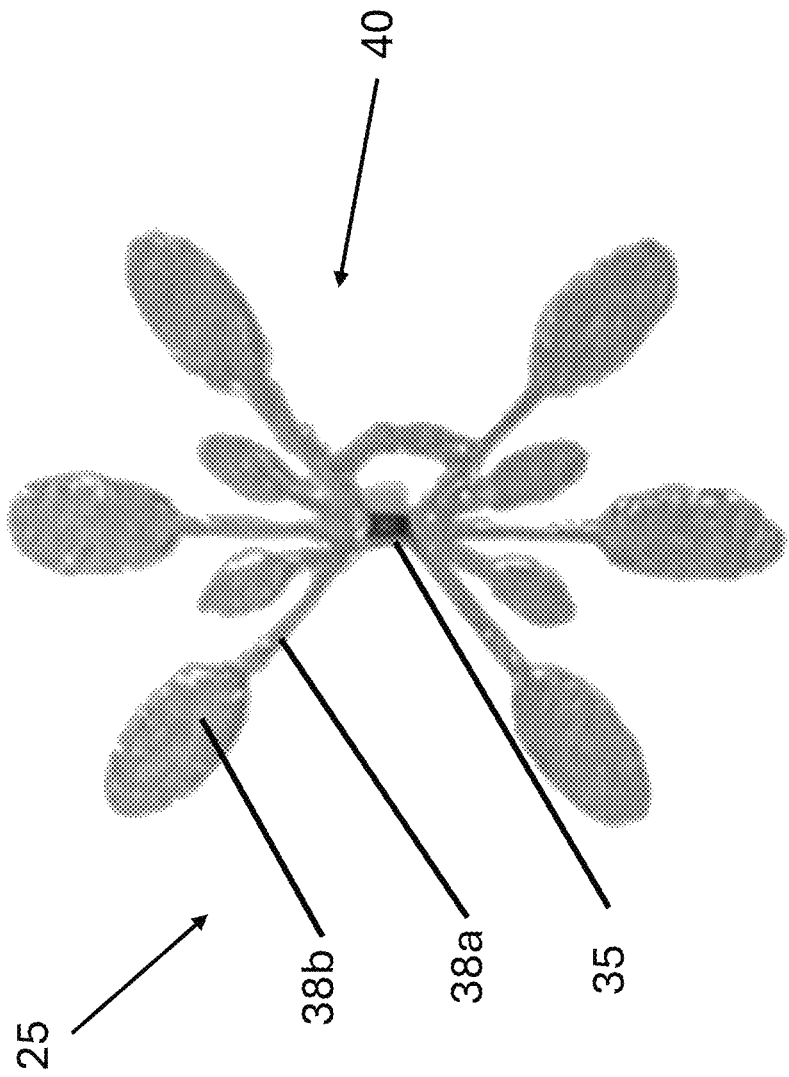
FIG. 4C is a top plan view of a modified multi-element snowflake nonlinear passive tag, in accordance with a non-limiting exemplary embodiment of the present disclosure.
Figure 5:
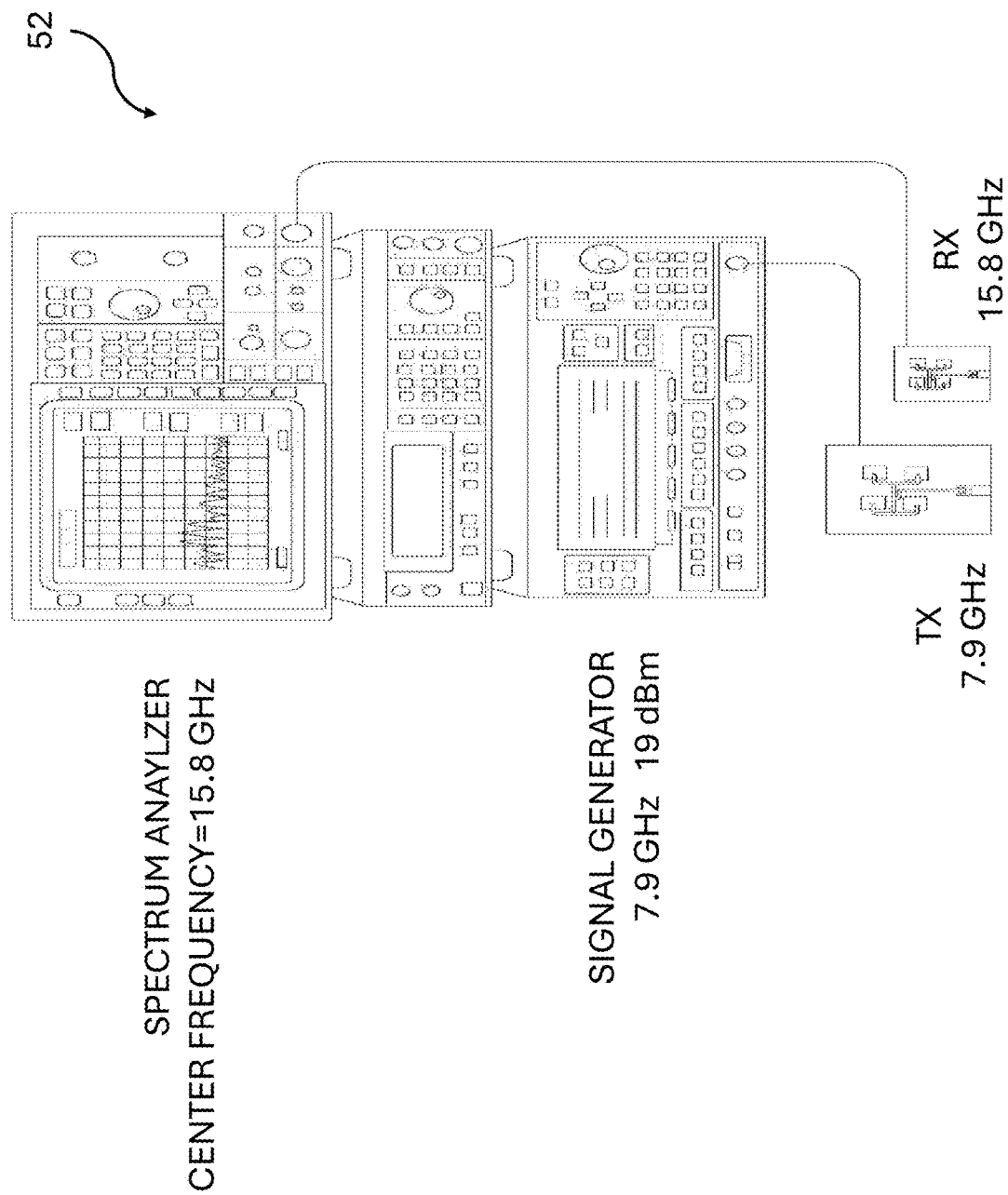
FIG. 5 is a perspective view of a spectrum analyzer and a signal generator used to verify the functions of the transmission and receiving antennas employed by the present system, in accordance with a non-limiting exemplary embodiment of the present disclosure.

In a non-limiting exemplary embodiment, the tag 25 patterns were designed on a computer drawing board and used a laser cuter with 0.1 mm precision to cut a customizable (e.g., paintable, modifiable, etc.) mask, and the conductive material was then applied through the mask to form the shape of the tag 25 on a paper substrate. The thickness h of the customizable conductive layer was estimated to be less than 0.1 mm. Finally, using the adhesive nature of the conductive material, the Schottky diode 35 adhered to the gap 50 (as shown in FIG. 2). The tag's 25 measured weight, including the paper substrate, was less than 0.1 grams for a single-element 28 configuration and less than 0.2 grams for multi-element 28 structures. And the total weight of the conductive material and Schottky diode 35 is less than 0.004 grams. The tag 25 size compared with a 25-cent coin is illustrated in FIG. 4B. The Schottky diode 35 with 0402 packing has a length of 0.6 mm and a width w of 0.3 mm. All testing tags 25 were fabricated manually, resulting in the customizable antennas having up to 1 mm deviation in length and 0.5 mm deviation in width compared to the design parameters.

Figure 6A:
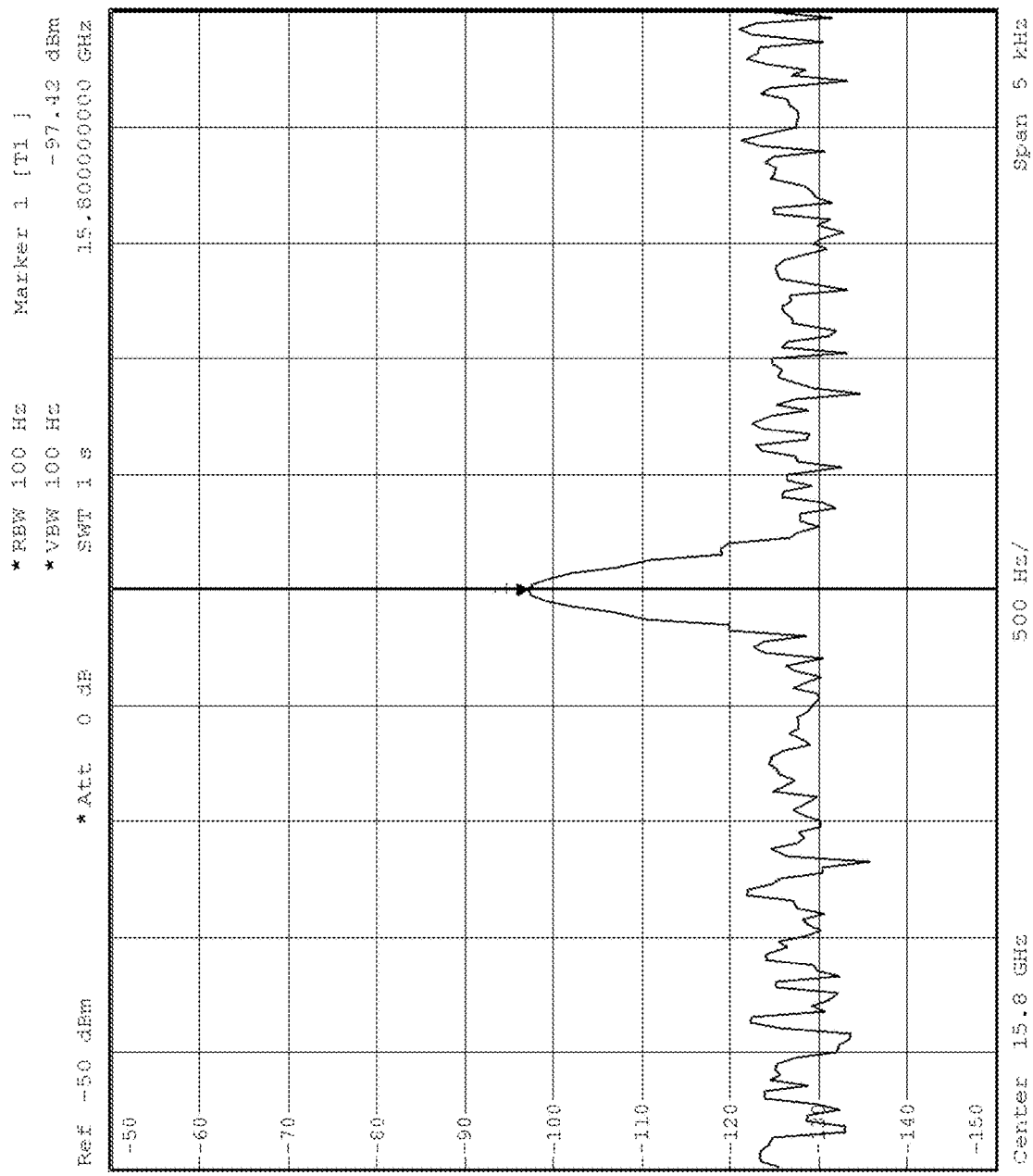
FIG. 6A is a graph illustrating the measurement peak of 97.42 dBm on the spectrum analyzer at the center frequency of the modified multi-element tag at a distance of 2.7 ft, in accordance with a non-limiting exemplary embodiment of the present disclosure.
Figure 6B:
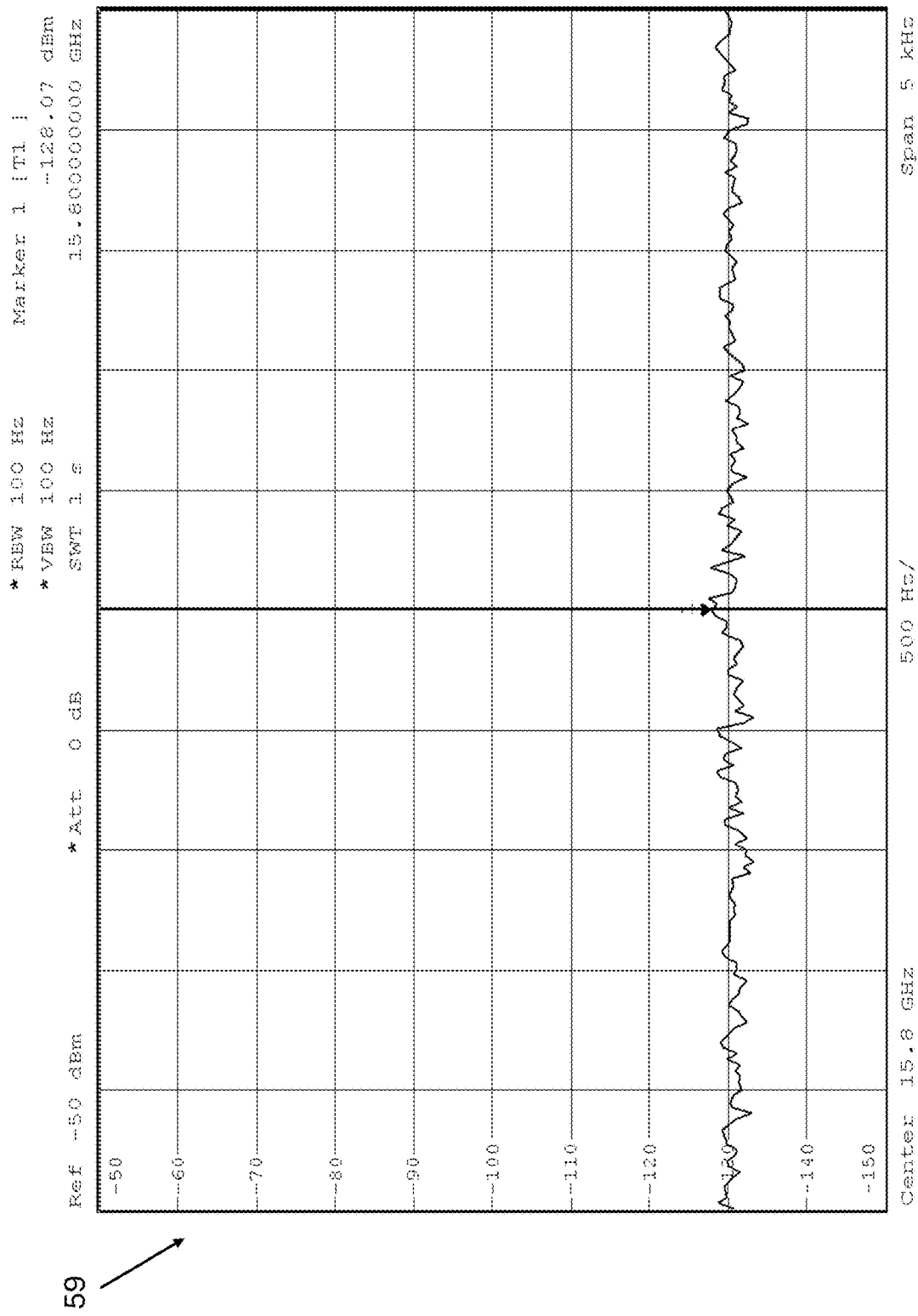
FIG. 6B is a graph illustrating the nonlinearity of instruments after averaging, in accordance with a non-limiting exemplary embodiment of the present disclosure.

In a non-limiting exemplary embodiment, experimental tests focused on the nonlinear tag's 25 distance performance with respect to the (SNR) ratio reflected on the R&S FSU spectrum analyzer 52 shown at graph 58 in FIG. 6A. The transmitting antenna 23 was directly connected to an HP 83630A signal generator 53 with a 7.9 GHz supplied frequency and power level at 19 dBm, and the receiving antenna 24 was directly connected to the spectrum analyzer with a center frequency of 15.8 GHz. FIG. 6A shows the measurement peak of 97.42 dBm on the spectrum analyzer at the center frequency of the modified multi-element tag 25 at a distance of 2.7 ft. Graph 59 in FIG. 6B shows the nonlinearity of instruments after averaging. The noise floor (NF) was determined using the spectrum analyzer's 52 averaging function. And it also shows the second harmonic NF peak at the center frequency of 15.8 GHz at −128.7 dBm, while the NF at the sideband frequencies stays relatively constant, averaging at −131 dBm. The instruments' nonlinearities may present different values at different times, depending on the placements of the transmitting and receiving antennas 23, 24 and the power supplied by the signal generator. Thus, an averaging was conducted before each measurement. To have a clear view of the peak at the center frequency on the spectrum analyzer 52, reduce any access noise, and create an observable sweep time of 1 second, the resolution bandwidth and video bandwidth were set at 100 Hz, and the frequency span was set at 5 kHz. Two sets of 10-minute averaging were conducted for the experimental results shown in FIGS. 7A-7B, with NF of −124.55 dBm and −125.98 dBm, respectively. And the average NF of −125.27 dBm was used to calculate the SNR.

Figure 7A:
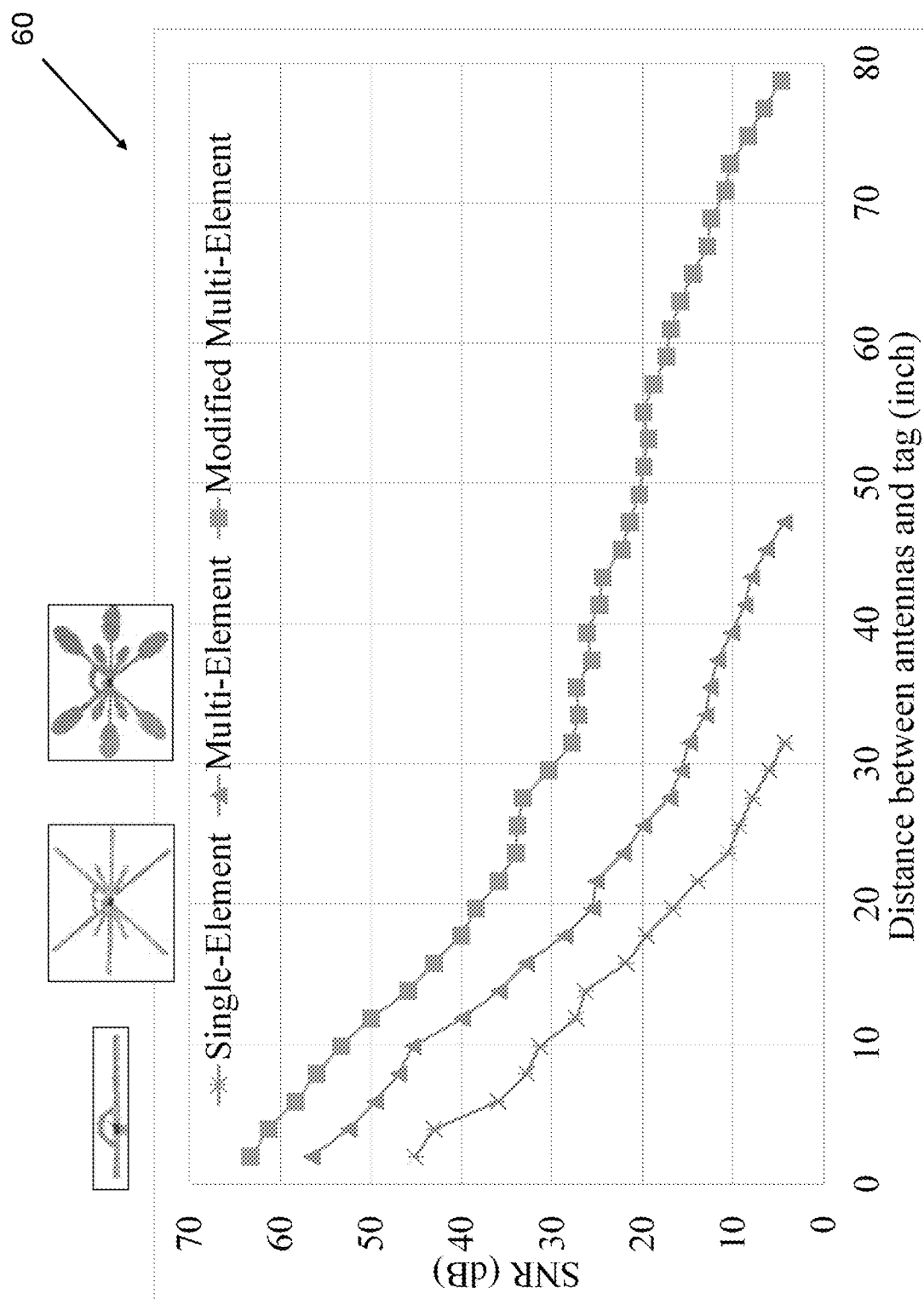
FIG. 7A is a plot graph that illustrates the signal-to-noise ratio (SNR) versus distance comparison between single-element, multi-element, and shape-modified multi-element configurations of the transponder tag, in accordance with a non-limiting exemplary embodiment of the present disclosure. The plot graph presents results based on transponder tag-only without any compression or bends thereof.
Figure 7B:
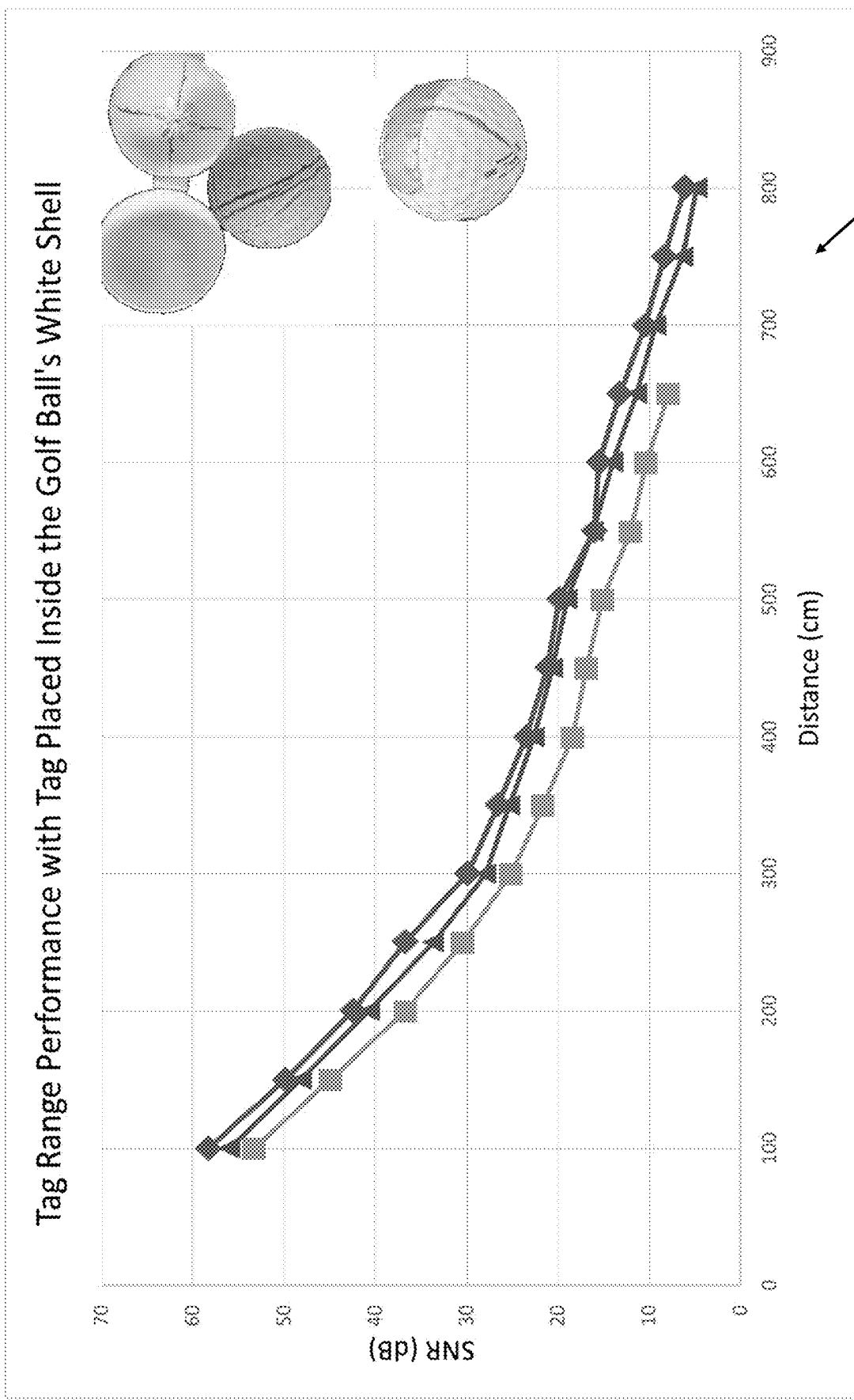
FIG. 7B is another plot graph that illustrates the SNR versus distance when the transponder tag is placed inside the golf ball's white outer shell: the transponder tag is compressed and bent according to the curvature of the golf ball, in accordance with a non-limiting exemplary embodiment of the present disclosure.

In a non-limiting exemplary embodiment, FIGS. 7A and 7B illustrate plot graphs 60 and 61, respectively, which show the SNR versus distance comparison between a transponder tag 25 having a single-element 28, multi-element 28, and modified multi-element 28 configurations. The term element 28 means an electromagnetic nonlinear element 28 (i.e., Schottky diode 35 which has a stem 38a and a lobe/pebble 38b). The SNR values were obtained by taking the absolute difference between the NF and the peak value at the center frequency from the spectrum analyzer 52. The results of the single-element 28 tag 25 presented successful results for the intended purpose of the present disclosure based on the Schottky diode's 35 nonlinearity. With the appropriate antenna parameters, there exists a second-order harmonic response. Integrating multiple elements onto tag 25 significantly improved the SNR at the same distance as the single-element 28 configuration and increased the detectable distance by 50% from 2.6 ft to 3.9 ft. The distance test was conducted by using a hand-held tag 25 moving away from the transmitting and receiving antennas 23, 24, observing, and recording the peak response from the spectrum analyzer 52. Location experiments were performed by sticking tag 25 on top of a chair and affixing the transmitting and receiving antenna 23, 24 on a mobile platform. Then rotating the platform scans across the space to find the direction of the tagged objects, and the reflected signal strength presented a relative distance between the platform and the tag 25.

Figure 3:
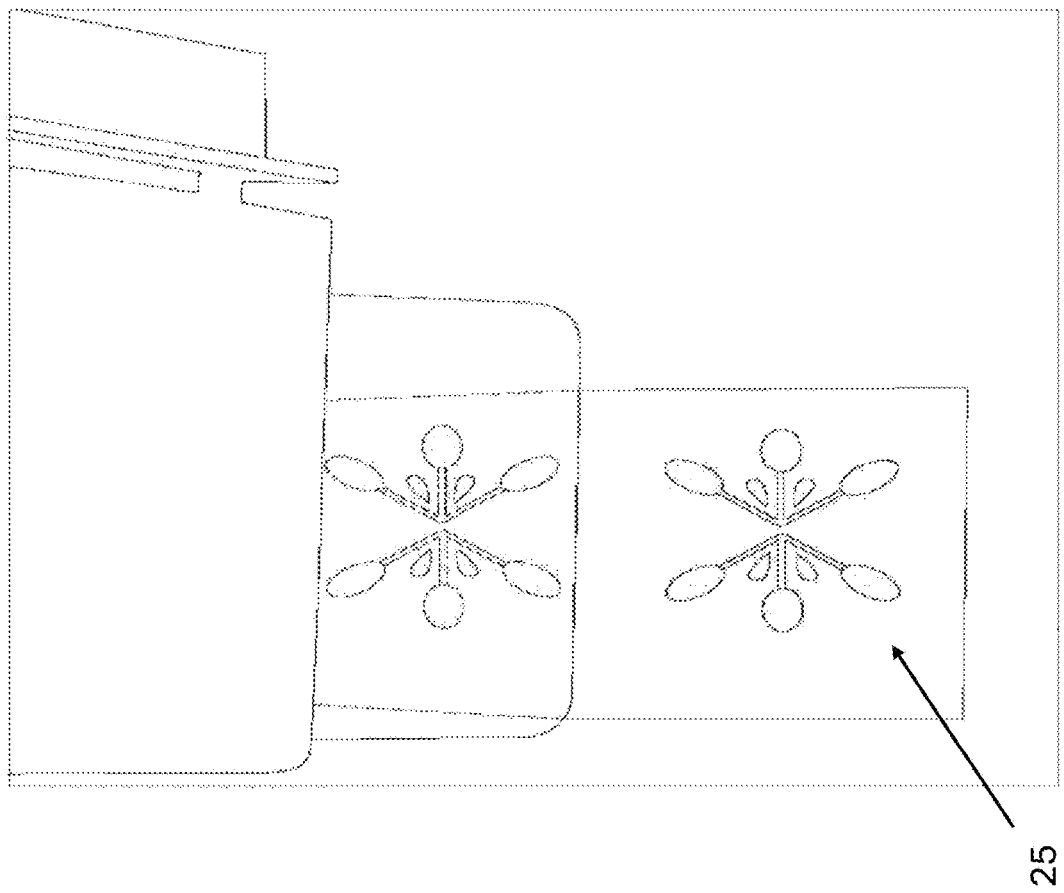
FIG. 3 is a perspective view of a laser cut antenna snowflake tag pattern, employed by the non-linear radar system, in accordance with a non-limiting exemplary embodiment of the present disclosure.

In a non-limiting exemplary embodiment, multiple modifications were made to the single-element 28 and multi-element 28 configurations. And the best-performing modification is shown in FIG. 3. From the SNR versus distance plot, the modified multi-element 28 gained significant SNR compared to the unmodified version and further increased the detectable distance by 67% from 3.9 ft to 6.6 ft. Data points were recorded by reading the peak response values from the spectrum analyzer 52. And it should be noted that all recorded data must have shown the measurement's sustainability and repeatability of the peak because of the sensitive nature of the antennas and instruments.

In a non-limiting exemplary embodiment, with reference to Table 1 below, system 20 of the present disclosure includes three main blocks: a transmitting block 30, a receiving block 31, and a processing block 32.

Figure 10:
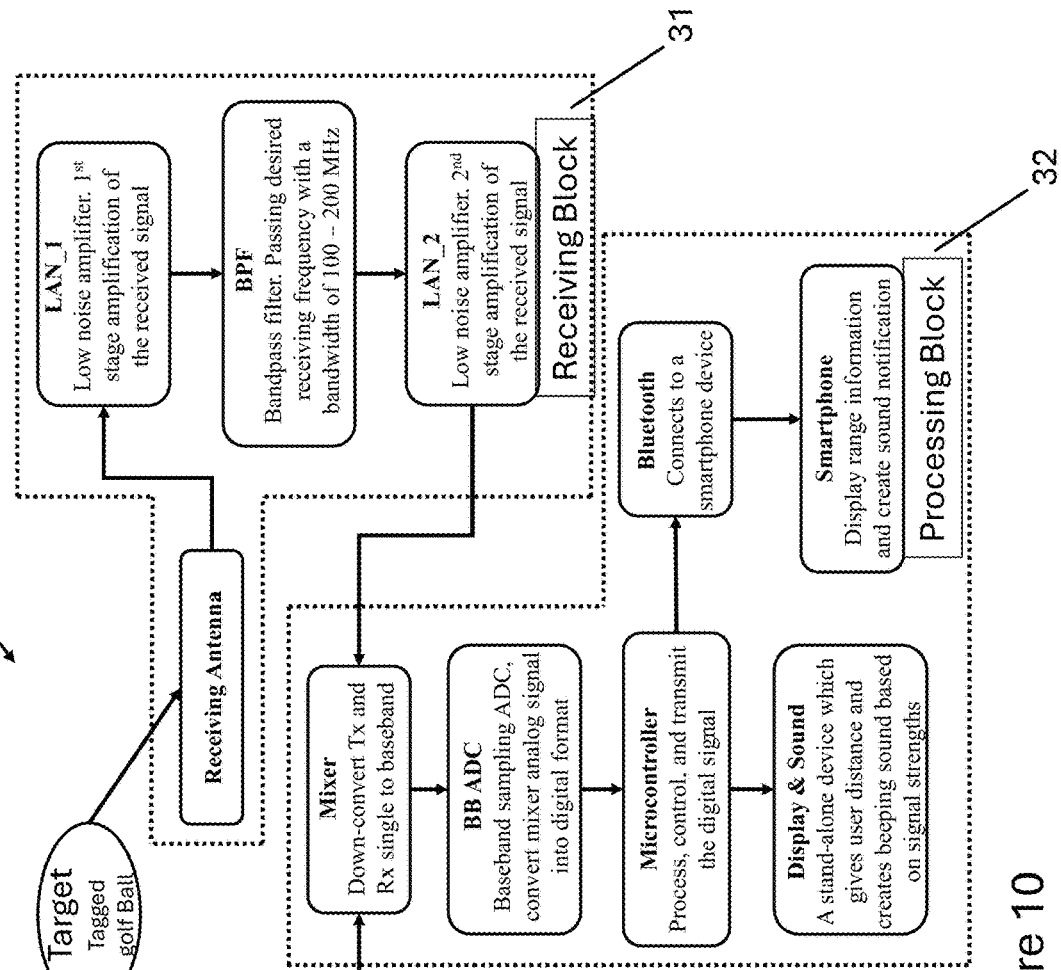
FIG. 10 is a flowchart illustrating the control logic algorithm of the software employed by the present disclosure, in accordance with a non-limiting exemplary embodiment of the present disclosure.

In a non-limiting exemplary embodiment, referring to FIGS. 8-10, the transmitting block 30 generates and transmits the fundamental frequency to detect the tagged target (golf ball 26). The circuit contains a voltage-controlled oscillator generating the fundamental frequency at 4 GHz. The transmit frequency may vary from 1 to 8 GHz. The signal then goes through a series of filters and amplifiers to ensure only the desired frequency is being transmitted and amplified at the transmitting antenna 23. The transmitting frequency is split into two paths: one goes to the transmitting antenna 23, and another goes through a frequency doubler and sent to the mixer for down-conversion.

In a non-limiting exemplary embodiment, the receiving antenna 24 detects the 2nd-order harmonic frequency bounced back by the nonlinear tag 25, sending the signal through the receiving chain with a series of low-noise amplifiers and a bandpass filter. As a result, the received 2nd-order harmonic signal is weak and will be amplified and filtered at the desired receiving frequency of 8 GHz. The receive frequency may vary from 2 to 16 GHz.

In a non-limiting exemplary embodiment, the processing block 32 first down-converts the doubled transmitting frequency and the received 2nd harmonic frequency with a mixer and sends a direct current (DC) signal to a baseband analog to digital converter (ADC) for sampling. The sampled data is then sent to a microcontroller which controls the output to either a set of speakers and display or to a BLUETOOTH® device for smartphone connection.

TABLE 1

| System Components And Their Parameters | | |
|---|---|---|
| VCO (×1) 4 GHz | Pout | +5 dBm |
| | Frequency | 3.9-4.45 GHz |
| BPF 4 GHz (×1) | 50 Ω | |
| | Pass band | 3.7-4.5 GHz |
| | Insertion Loss | 1.4 dB (4.1 GHz typical) |
| | VSWR | 1.5 dB |
| BPF 8 GHz (×1) | 50 Ω | |
| | Pass band | 7.9-8.1 GHz |
| | Insertion Loss | 2 dB (8 GHz typical) |
| | VSWR | 1.6 dB |
| LPF 4 GHz (×1) | 50 Ω | |
| | Cut-Off Frequency | 5.2 GHz |
| | Insertion Loss | 0.9 dB (@ 4 GHz) |
| | Return Loss | 16.31 dB |
| LNA (×2) | 50 Ω | 8 GHz Receiver |
| | Gain | 23.1 dB (typical) |
| | Input Return Loss | 20 dB |
| | Output Return Loss | 16 dB |
| | P1dB | 19.8 dB |
| | OIP3 | 28.7 dB |
| | NF | 1.2 dB |
| Circulator (×1) | 50 Ω | |
| | Frequency Range | 3.8-4.0 GHz |
| | Isolation | 9 dB (3.9 GHz) |
| | Insertion Loss | 1.1 dB |
| | VSWR | 1.8 dB |
| Splitter (×1) | 50 Ω | |
| | Frequency | 2.8-7.2 GHz |
| | Total Loss | 3.5 dB @ 4 GHz |
| Mixer (×1) | Bandwidth | 3.7-10 GHz |
| | Conversion Loss | ~6 dB (8 GHz) |
| | IP3 | ~14 dBm (LO +7 dBm) |
| Multiplier (×1) | 50 Ω | |
| | Output Bandwidth | 5.4-9.6 GHz |
| | Conversion Loss | 12.09 dB (4 GHz input) |
| | | 21.89 dB (8 GHz output) |
| Monolithic Amplifier | 50 Ω | |
| | Gain | 14.9 dB @ 4 GHz |
| | OIP3 | 35 dB @ 1 GHz |
| TX (first) Antenna 2 × 2 @ 4 GHz | Frequency: 3.94 GHz | 7.42 dB |
| RX (second) Antenna 2 × 2 @ 8 GHz | Frequency: 7.88 GHz | 9.8~10.07 dB |

Advantageously, the present disclosure provides a series of passive nonlinear miniature tag 25 designs (tag 25+golf ball 26), via laser-assisted fabrication, and successful range tests up to approximately 8.0 meters. The tags 25 are light-weight, inexpensive, and can be fabricated manually. In addition, the strong signal reflection from the tags 25 has excellent potential for locating subjects of various types and sizes.

In a non-limiting exemplary embodiment, a hand held unit 21 contains a radio frequency transmitter, a receiver, processing and display electronics, and a power source 36. The transmitter transmits a low power signal (<1 watt) at a radio frequency, f1, allowed for civilian, commercial use.

In a non-limiting exemplary embodiment, the transponder tag 25 is attached to or imbedded in the object (golf ball) to be located and includes an electromagnetically nonlinear element 28 and two antennas 23, 24. One antenna is designed for the primary signal, f1. By virtue of the nonlinear device, a second RF signal, f2, an integer multiple of the primary frequency, is generated and transmitted by the second antenna 24. Generally, f2 is twice f1. The transponder tag 25 is passive, requiring no power source 36 other than the received, primary signal.

In a non-limiting exemplary embodiment, the receiver includes an antenna designed for the frequency of the transponder output, f2, signal processing electronics, involving a microprocessor, which converts the received signal to distance and signal strength information. That information is supplied to the display electronics, visual and/or audio, for the user. The user determines the direction to the tag 25 as that provides the maximum signal when slewing the hand held unit 21 from side to side.

In a non-limiting exemplary embodiment, a cell phone with the appropriate software application(s) could provide power to the hand held unit 21 and display audio and visual signals, which are output from unit 21.

In a non-limiting exemplary embodiment, the present disclosure refers to a type of nonlinear radar called harmonic radar system 20 in which a signal primary frequency is transmitted by a hand held unit 21, and a second frequency (an integer multiple of the primary frequency) is returned by the tag 25.

In a non-limiting exemplary embodiment, another type of nonlinear radar is intermodal radar system, in which two or more primary signals could be transmitted and several frequencies returned. The returned signals are linear combinations of the two primary signals. This system would also use a passive tag 25 as described above, but the transmitter/receiver would be more complex.

Advantageously, this present disclosure combines a compact, lightweight, and uncomplicated transceiver and tag 25 with adequate range to be practical and useful for the golfer. Tag 25 may be built into the center of ball 26, just under the ball 26 cover, or on the ball 26 surface. This present disclosure includes a light weight, pocket sized transceiver similar to a cell phone and a very small, lightweight tag 25 so as not to affect flight characteristics of the ball 26.

Referring to FIGS. 1-23, in a non-limiting exemplary embodiment(s), the present disclosure provides a nonlinear radar system 20 for finding a golf ball 26 which is not observable or easily located by an observer's line of sight. The nonlinear radar system 20 includes a hand held unit 21, which generates and emits a radar signal and receives the reflected signal. Transponder tag 25 contains an electromagnetically nonlinear element 28 attached to a golf ball 26. Whenever the radar signal encounters a nonlinear element 28, a series of reflected return signals are generated at harmonic frequencies, integer multiples of the illuminating frequency (harmonic radar). If the radar set (hand held unit 21) generates two signals at different frequencies, multiple combinations of those two frequencies are generated by the transponder tag 25 (intermodal radar). In either case, the radar set receiver (hand held unit 21) would be turned to a harmonic frequency or an intermodal frequency. Notably, most objects on a golf course, such as grass, leaves, brush, or an ordinary golf ball 26 will reflect the illuminating radiation so monitoring the return at the illuminating frequency would detect return from all objects making it impossible to detect a golf ball 26. Monitoring a harmonic of the illuminating frequency would enable the nonlinear radar system 20 to "see" an object equipped with a nonlinear element 28 but not grass, leaves and other materials on the course since they would not return a signal at a harmonic frequency.

In a non-limiting exemplary embodiment, the nonlinear radar system 20 includes a small, handheld device 21 which transmits a low power radar signal and receives the signal at the harmonic frequency from a golf ball 26 to which an electromagnetic nonlinear element 28 has been affixed. The handheld device 21 will have a readout screen which will indicate the distance and direction to the ball 26. Similarly, monitoring an intermodal frequency of the illuminating frequencies would enable the nonlinear radar set (unit 21) to "see" the object of interest.

In a non-limiting exemplary embodiment, a nonlinear radar has been shown to be capable of locating and ranging an object which contains an electromagnetic nonlinear element 28. Elements that are inherently electromagnetically nonlinear, such as metal-metal contacts, semiconductors, ferroelectrics, antennas, or filters, will return radar signals at harmonic frequencies that differ from the illuminating frequency (f0) by integer multiples of the illuminating frequency, fn=nf0 where n=2, 3, 4, . . . ) or, if two frequencies, f1 and f2, are transmitted, at intermodal frequencies (such as 2nd harmonics at 2f1 and 2f2, and intermodal signals 2f1-f2, 2f2-f1, and f1+f2). Intermodal signals can also be generated at 3rd and higher order harmonics and by three or more transmitted frequencies). Advantageously, the nonlinear radar (handheld unit 21) is configured to emit one frequency and monitor a harmonic return frequency or emit multiple frequencies and monitor an intermodal return frequency (to avoid detecting grass, debris, non-golf ball objects).

In a non-limiting exemplary embodiment, a Schottky diode 35 may be used as the nonlinear element 28, but other nonlinear elements may be used. Objects which did not contain such elements, such as grass, leaves, brush, trees, or rocks will return signals at the illuminating frequency creating strong background or clutter which would obscure the return from a small object at the illuminating frequency. An object equipped with an electromagnetic nonlinear element 28 can be distinguished from the background clutter by monitoring the harmonic returns (frequency levels).

In a non-limiting exemplary embodiment, any golf ball 26 can be modified to carry an electromagnetic nonlinear element 28. While there are several types of such elements, (metal-metal contact, various types of semiconductors, ferro electrics, antennas), a Schottky diode 35 is preferably used to produce harmonic frequencies. The Schottky diode 35 can be made on the order of 0.3 millimeter (0.02 inches). The weight of such a small diode is very small and could easily be counterbalanced at the golf ball 26. The Schottky diode 35 could be glued to the ball 26 in a dimple and have negligible effect on flight characteristics. Alternatively, diode 35 could be inserted into the cover of the golf ball 26 by means of a very small slit in the cover or a small hole drilled into the cover or pressed into one of the dimples and secured or covered with an adhesive glue. In either case, a small amount of glue could be used to hold the Schottky diode 35 in place. Diode 35 must be in "contact" with two antennas at the golf ball-one tuned to the illuminating frequency and one to the desired harmonic frequency. The desired harmonic frequency would normally be twice the illuminating frequency, but other multiples of the illuminating frequency may also be used. The antennas may be made of thin wire, and applied with an electrically conductive material, or a fractal antenna. Fractal antennas are designed to be very compact and could be applied as a small sticker or decal. The antenna may not need to be in physical contact with the diode.

In a non-limiting exemplary embodiment, an air gap 50 between the antenna and a micro RFID tag 25 is acceptable and even beneficial.

In a non-limiting exemplary embodiment, the harmonic radiation may not be isotropic, so a single nonlinear element 28 may not provide a sufficiently strong signal to be detected depending on the orientation of the golf ball 26 and the handheld unit 21 (radar set). Multiple transponder tags 25 can be installed to provide an adequate signal over greater space. The attachment of a diode 35 and antennas would add much less weight to the golf ball 26 than any active element 28 using a battery or circuitry for an on/off switch or recharging, so the total weight of multiple diodes 35 and antennas should not affect flight characteristics if they are positioned correctly. For example, two elements at 180 degrees, three elements located in the equatorial plane at 120 degrees apart, four elements located tetrahedrally, etc. The diodes 35 are quite rugged and should not be damaged in the normal course of play, nor should the nonlinear element 28 fall off or out of the ball 26 in normal play. If an element 28 is lost or damaged, additional elements 28 can still provide nonlinear radar system 20 capabilities.

In a non-limiting exemplary embodiment, the nonlinear radar system 20 includes a small, handheld unit 21, approximately the size of a cell phone, which can easily be carried by the golfer. Unit 21 includes a transmitter and receiver (collectively the "unit 21") powered by batteries. Alternatively, unit 21 could be powered by a rechargeable battery or even photovoltaic solar array. Unit 21 serves as a transmitter of low powered electromagnetic radiation and a receiver of the return signal. The signal frequencies will be in the bandwidths allowed by law for commercial use and will have a strength of approximately one watt. Additional circuitry will measure the distance to the golf ball 26 and the signal strength. Unit 21 is also equipped with a flat screen display 22, such as an LED or backlit LCD array which can be read on the golf course. Display 22 will indicate the distance to the ball 26 as well as an indication of signal strength. By sweeping the handheld unit 21 horizontally from side to side, the direction to the ball 26 will be indicated on display 22 as the direction of the maximum signal strength. Unit 21 could also produce a tone to indicate distance and direction to ball 26.

In a non-limiting exemplary embodiment, the golf ball 26, which could be any ball 26 the golfer desires, would be fitted with a transponder tag 25. The transponder tag 25 includes an electromagnetic nonlinear element 28 such as, but not limited to a diode 35, metal-metal contact, or metal-metal oxide contact, an antenna, and be passive, requiring no power source 36 but the incoming radiation from the handheld unit 21. The antenna may be a small wire, a fractal antenna, conductive material, or other material which would serve as an antenna. The nonlinear element 28 can be attached to the ball 26 surface, or inserted into covering through a small hole cut or drilled into the covering. The diode 35 or other nonlinear element 28 would be placed into the hole, or, alternatively, placed in a dimple of the ball 26. The antennas would be attached or applied to, or painted (as an example) on the ball 26 surface. The antenna may be in contact with the nonlinear element 28 or communicate with the ball 26 over a small gap 50. Alternatively, the nonlinear element 28 and antenna may be combined on a small adhesive patch. A fractal pattern antenna patch would be ideal since the golfer could apply a replacement on the course should a patch fall off or become damaged in the course of play. The antenna radiation strength is not generally isotropic (uniform in all directions). The golf ball 26 may be equipped with multiple transponders tags 25 to insure a strong signal in any direction and at acceptable distance.

In a non-limiting exemplary embodiment, although the use of very small, surface mounted transponder tag 25 will allow the golfer to use the nonlinear radar system 20 with any golf ball 26 and to equip or even replace a transponder tag 25 in the field, the transponder tag 25 could be placed within the ball 26 during manufacture. Since the nonlinear radar system 20 does not require a battery or additional circuits to turn the power on or off or to recharge the battery, the golf ball 26 so equipped should be less expensive to produce and last much longer than a ball 26 using an active, battery powered transponder tag 25 nonlinear radar system 20.

In a non-limiting exemplary embodiment, the nonlinear radar nonlinear radar system 20 may be used for locating many different types of objects beyond golf balls. For instance, a transponder tag 25 could be applied to eyeglasses, electronics remote units, keys, cell phones, computers or electronic tablets, or any other objects commonly misplaced in the home, car, or elsewhere. A transponder tag 25 could also be applied to archery arrows or other outside equipment that might be difficult to find in normal use.

Referring to FIGS. 13-13A, in a non-limiting exemplary embodiment, the nonlinear radar system 20 includes a handheld unit 21 configured to generate and emit an incident signal frequency and a transponder tag 25 attached to an existing golf ball 26. Such a transponder tag 25 is in communication with and responsive to handheld unit 21. Transponder tag 25 includes an electromagnetic nonlinear element 28 and at least one antenna in communication with the electromagnetic nonlinear element 28. Advantageously, upon detecting the incident signal frequency, the antenna (part of snowflake 40 shape) is configured to transmit a return harmonic signal having a frequency different from the incident signal frequency. Notably, transponder tag 25 is passive and does not require a power source 36 other than incident radiation. Advantageously, the handheld unit 21 includes a first circuit in communication with the electromagnetic nonlinear element 28 for generating and transmitting the incident signal frequency within civilian-use-permitted frequency bands and at a power of about one watt, and a second circuit in communication with the electromagnetic nonlinear element 28 for receiving and processing the return harmonic signal configured to determine a distance and direction from the existing golf ball 26 to the handheld unit 21 as well as to determine a signal strength of the return harmonic signal.

In a non-limiting exemplary embodiment, handheld unit 21 includes a display screen 22 and a graphical user interface 33 illustrated on the display screen 22. Such a graphical user interface 33 is configured to display the distance from the existing golf ball 26 to the handheld unit 21 as well as the signal strength of the return harmonic signal.

In a non-limiting exemplary embodiment, the electromagnetic nonlinear element 28 is a Schottky diode 35.

In a non-limiting exemplary embodiment, the handheld unit 21 is configured to radiate at two or more unique frequencies and further configured to receive at least one of the return harmonic intermodal signals generated by the electromagnetic nonlinear element 28.

In a non-limiting exemplary embodiment, the transponder tag 25 is disposed inside the existing golf ball 26.

In a non-limiting exemplary embodiment, the transponder tag 25 is disposed on a surface of the existing golf ball 26.

In a non-limiting exemplary embodiment, the transponder tag 25 is placed within a small cavity of a cover of the existing golf ball 26.

In a non-limiting exemplary embodiment, the antenna (part of snowflake 40 transponder tag 25) is applied on the surface of the existing ball 26 with metallic or conductive material.

In a non-limiting exemplary embodiment, the transponder tag 25 may be placed on an inner sphere (under an outer sphere cover) of the golf ball 26. The harmonic signal penetrates the outer sphere cover effectively.

In a non-limiting exemplary embodiment, the transponder tag 25 antenna is a fractal antenna.

In a non-limiting exemplary embodiment, the handheld unit 21 is configured to generate and emit at least one audible signal associated with the distance from the existing golf ball 26 to the handheld unit 21 as well as the signal strength of the return harmonic signal as well as a direction from the handheld unit 21 to the existing golf ball 26.

In a non-limiting exemplary embodiment, the handheld transponder tag 25 further includes a power source 36 selected from a group including a rechargeable battery and a solar array.

In a non-limiting exemplary embodiment, the electromagnetic nonlinear element 28 includes at least one of a metal-metal contact and a metal-metal oxide contact.

In a non-limiting exemplary embodiment, the antenna includes one of a metal foil and a metallic wire.

Figure 14:
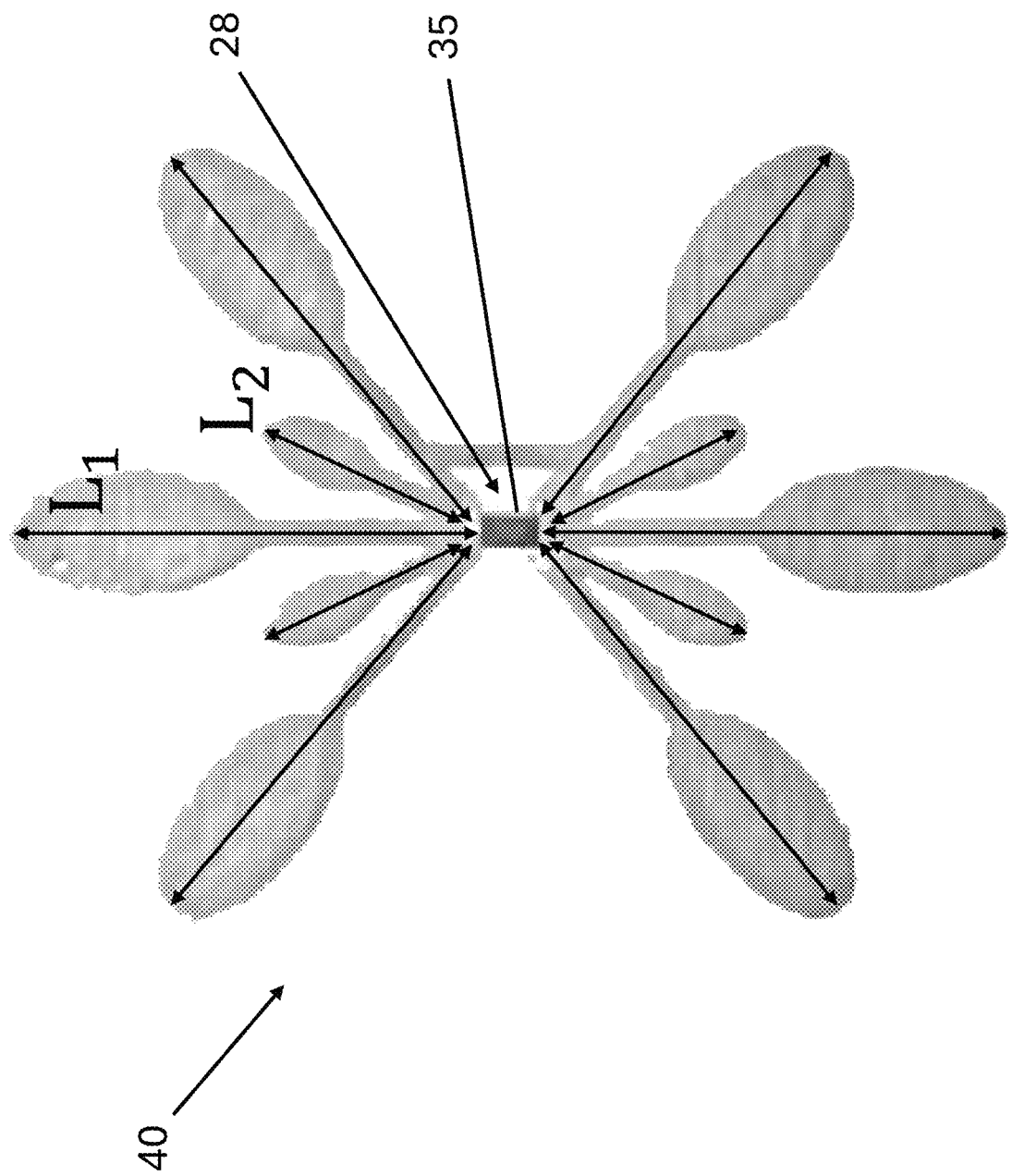
FIG. 14 is a top plan view identifying element (stem) lengths of a snowflake transponder tag structure, in accordance with a non-limiting exemplary embodiment of the present disclosure.

In a non-limiting exemplary embodiment, referring to FIG. 14, principles of the transponder tag 25 include varying the non-linear element 28 (stem 38$a$) lengths for the snowflake 40 structure. In particular, the structure of the snowflake 40 transponder tag 25 of non-linear element 28 lengths depend on the harmonic frequencies from the transceiver (from tag 25) and are calculated to be a quarter-wavelength of the transmit and receive frequencies (from handheld unit 21). Because there are two frequencies used in the present disclosure's harmonic system 20, the elements need to be in different lengths. For example, if the harmonic frequencies are 8 GHz and 16 GHz, the corresponding element 28 lengths are:

$$\text{Length}_1 = \frac{\text{Wavelength}_{8\text{ GHz}}}{4}, \text{ where Wavelength} =$$

(Speed of Light)/Frequency_(8 GHz)

$$\text{Length2} = \text{Wavelength\_(16 GHz)}/4, \text{ where Wavelength} =$$

(Speed of Light)/Frequency_(16 GHz)

Figure 15:
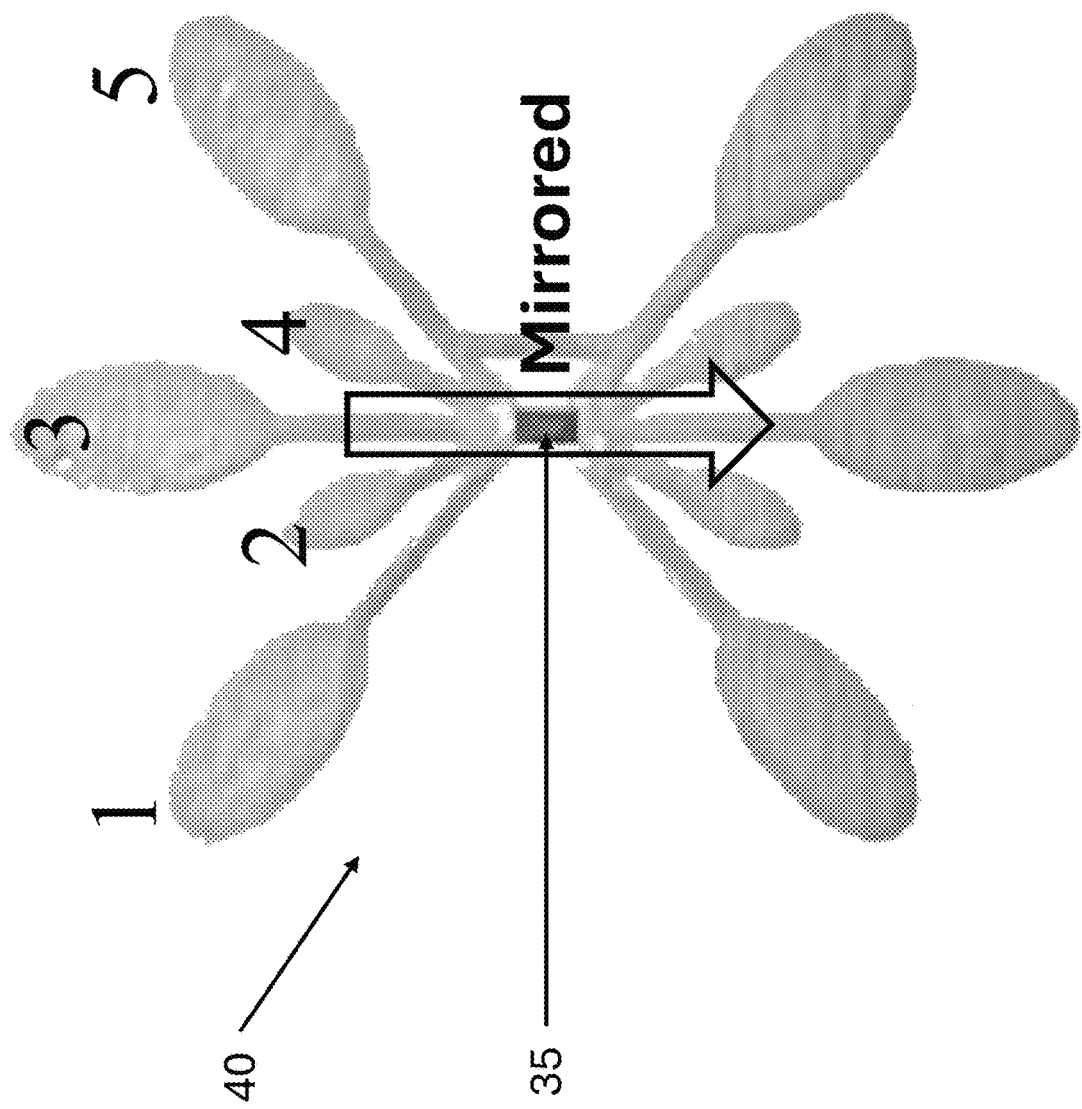
FIG. 15 is another top plan view identifying a quantity of elements (stems) of the snowflake transponder tag structure shown in FIG. 14, in accordance with a non-limiting exemplary embodiment of the present disclosure.

In a non-limiting exemplary embodiment, referring to FIG. 15, the number of stems 38a were determined based on experimentation. For example, we started with a single set of stems: a longer stem and a shorter stem, based on the calculated lengths from the equation above. Then, gradually increased the number of elements (stem 38a) to test and see if there is a stronger returned signal. We discovered that the number of stems 38a/elements may operably range from two to eighteen total elements on a single transponder tag 25. The best results are preferably provided with transponder tags 25 having approximately ten stems 38a/elements, with each stem 38a having a lobe/pebble at the end of it. Thus, the number of lobes 38b/pebbles depends on the number of stems 38a/elements.

Figure 16:
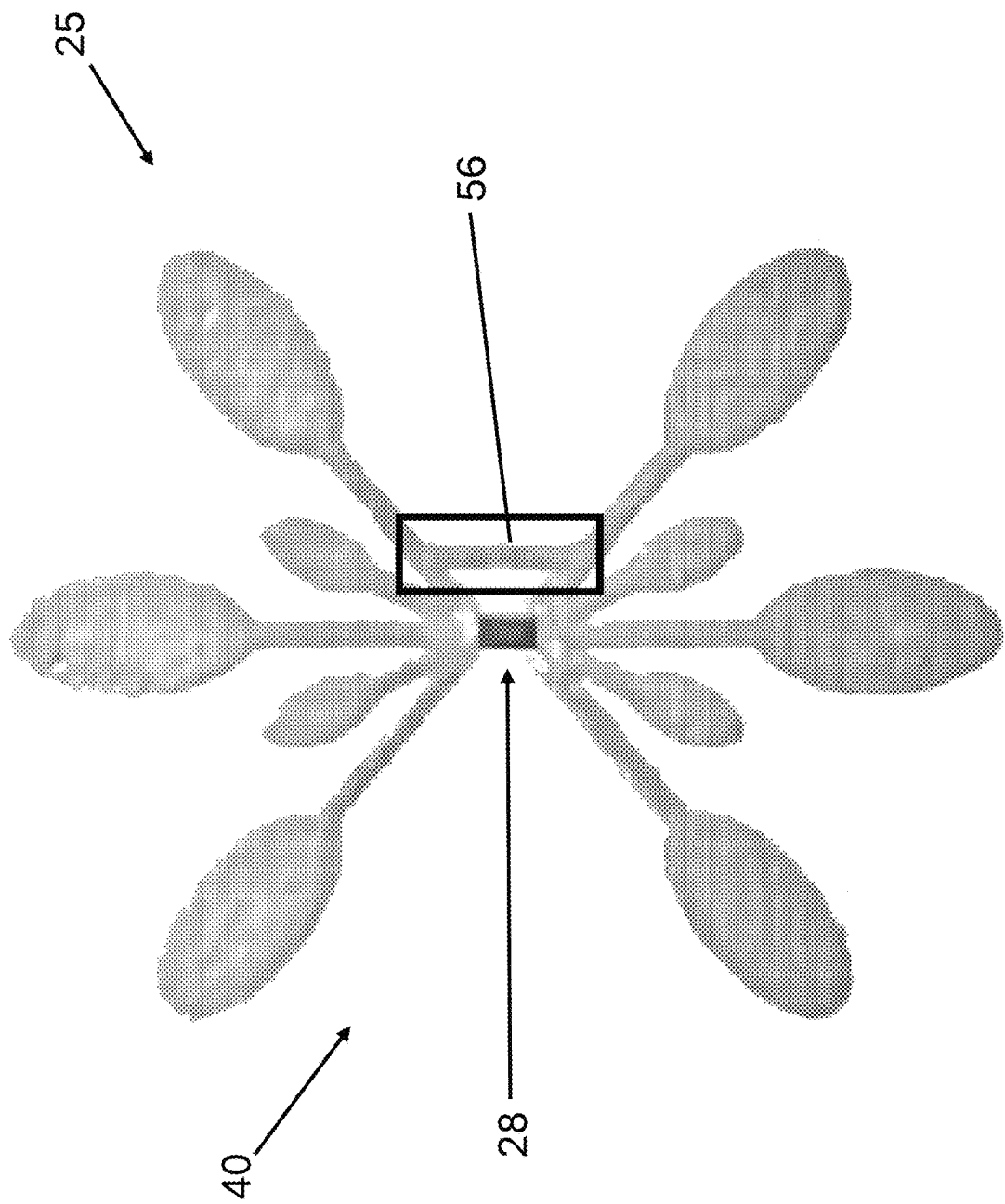
FIG. 16 is another top plan view identifying a DC-Short position of the snowflake transponder tag structure shown in FIG. 14, in accordance with a non-limiting exemplary embodiment of the present disclosure.

In a non-limiting exemplary embodiment, referring to FIG. 16, the DC-Short 56 position and length were determined based on experimentation. The DC-Short 56 provides a conducting bridge for two sides of the diode on the transponder tag 25. It provides stability and boost in capturing and returning the signal. The DC-short 56 position may range between 0.5 to 3 mm from the diode, and the length of the DC-short 56 is +/−1 mm between the shorter elements of the transponder tag 25.

Figure 17:
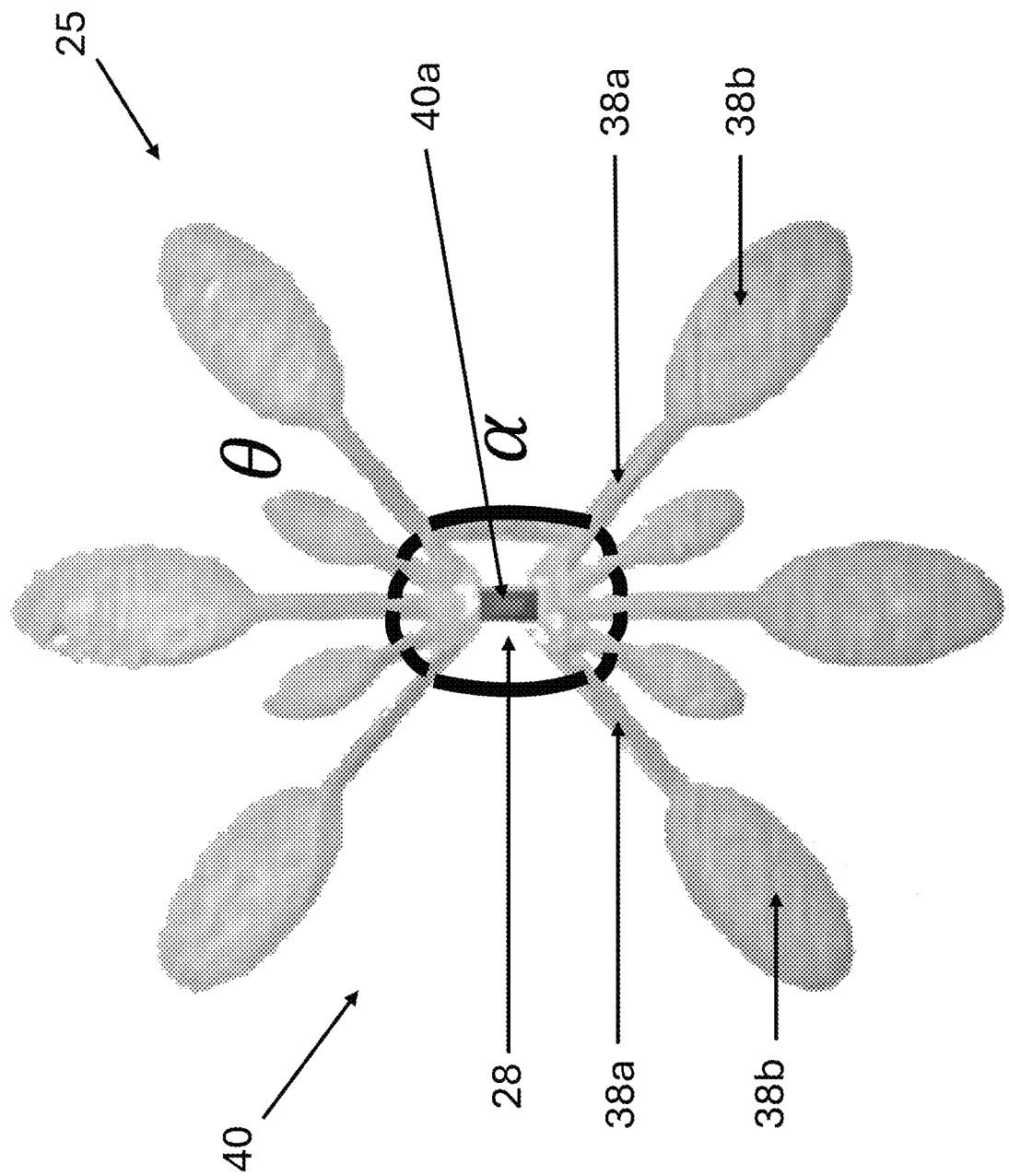
FIG. 17 is another top plan view identifying separation angles between the elements (stems) of the snowflake transponder tag structure shown in FIG. 14, in accordance with a non-limiting exemplary embodiment of the present disclosure.

In a non-limiting exemplary embodiment, referring to FIG. 17, the element 28 separation angles were determined based on experimentation. We started by picking arbitrary angles, and varying the angles while keeping other parameters unchanged, and through experiments we found which angle configurations provide the strongest return signal. The element 28 separation angles also depend on the number of elements. θ: Angle between each element 28 on one side of the diode. α: Angle between the closest elements on either side of the diode. For example, the angle between the elements 28 may range between 20 to 35 degrees for the elements/stems 38a which are placed on one side of the diode. Also, the angle between the elements/stems 38a may range between 60 to 90 degrees for the closest elements/stems 38a on opposite sides of the diode.

Figure 18:
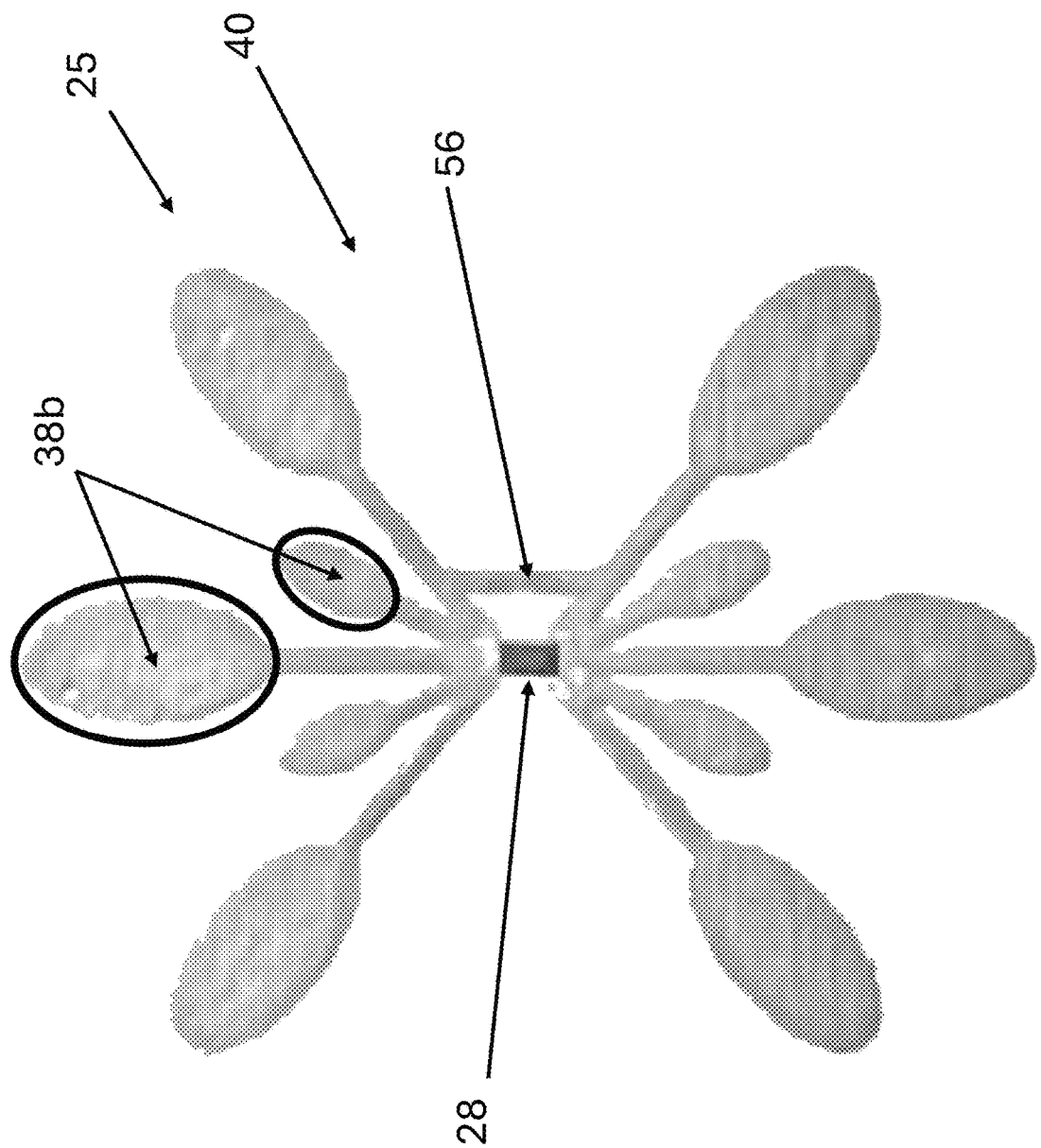
FIG. 18 is another top plan view identifying shapes and sizes of the lobes (pebbles) of the snowflake transponder tag structure shown in FIG. 14, in accordance with a non-limiting exemplary embodiment of the present disclosure.
Figure 19:
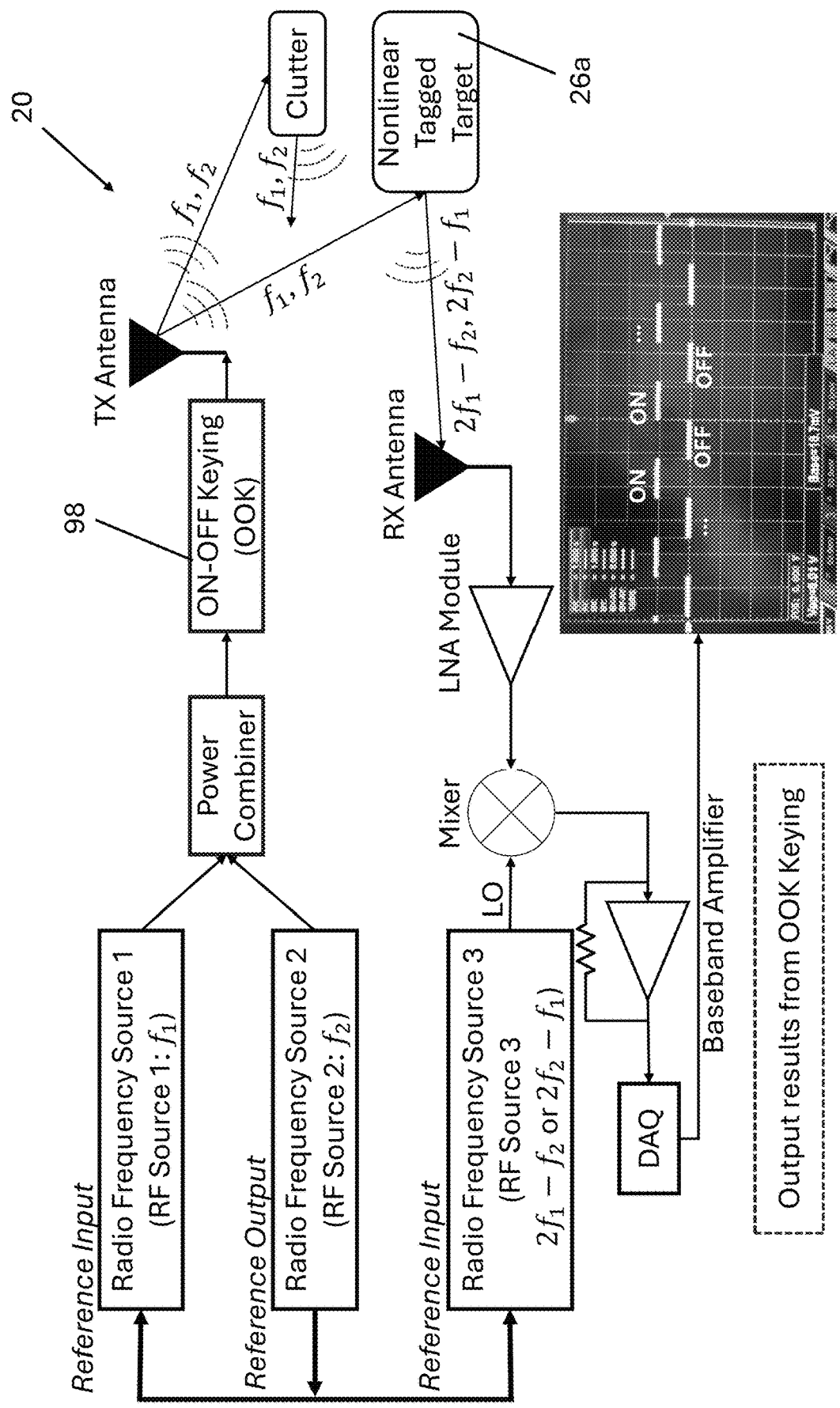
FIG. 19 is a high-level schematic diagram illustrating the interrelationships between selected major components of the non-linear radar system, in accordance with a non-limiting exemplary embodiment of the present disclosure.
Figure 20:
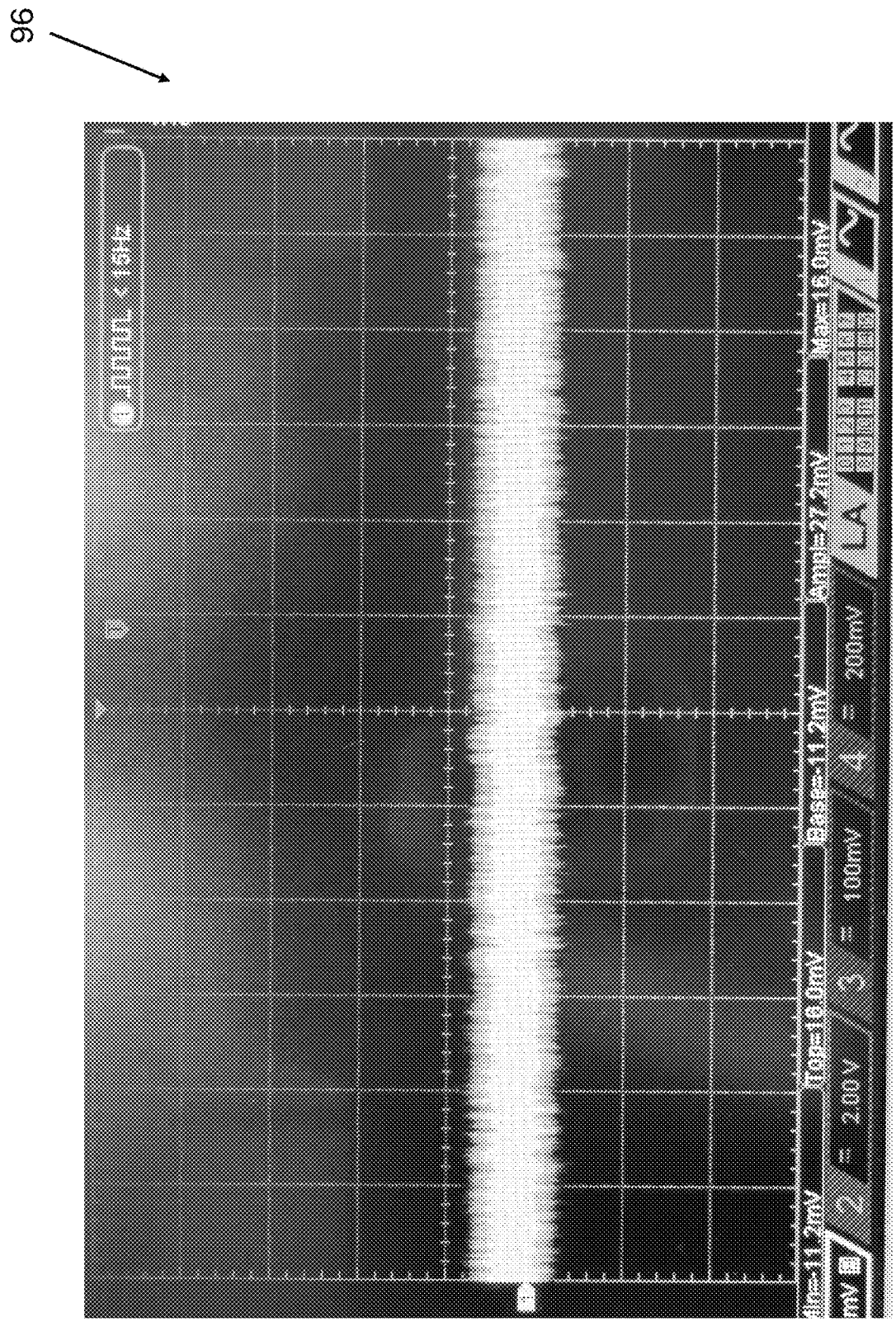
FIG. 20 is a graphical illustration of a baseband output of the receiver antenna detected signal (reflected return harmonic signal) pattern when no portable object has been detected, in accordance with a non-limiting exemplary embodiment of the present disclosure.

In a non-limiting exemplary embodiment, referring to FIG. 18, the shapes and sizes of the lobes 38b/pebbles 38b were determined based on experimentation. Experiments with various shapes added to the tips of the elements/stems 38a include the following shapes: circle, oval, triangle, various polygons, and many other geometrical shapes. We compared the performances and determined that oval is the best shape for this configuration. The current best performing transponder tags 25 employed an oval shape, for both longer and shorter elements. The teardrop and heart shaped lobes 38b/pebbles 38b were effectively and operably suitable to a lesser extent. The sizes of the lobes 38b/pebbles 38b were arbitrarily chosen in the beginning, then we varied the lobe/pebble sizes and compared the returned signal strength to determine the optimal sizes of the lobes 38b/pebbles 38b.

In a non-limiting exemplary embodiment, the number of pebbles 38b/lobes 38b are the same as the number of elements/stems 38a. Thus, there is a 1:1 ratio of the number of pebbles 38b/lobes 38b to the number of elements/stems 38a.

In a non-limiting exemplary embodiment, transponder tag 25 includes a plurality of stems 38a radially extended outwardly from a center of the transponder tag 25, and a plurality of lobes 38b coupled to a distal end of the stems 38a, respectively. Advantageously, a quantity of stems 38a equals a quantity of the lobes 38b and have a 1:1 ratio.

In a non-limiting exemplary embodiment, the number of transponder tags 25 applied onto the golf ball 26 was determined by experimentation. Such experimentation included starting with a single transponder tag b 25, then gradually increasing the number of transponder tags 25 applied to the golf ball 26. Then, experiments were performed to determine if there are any interferences between transponder tags 25, and their relative positions and orientations. Next, experiments were conducted to determine if multiple transponder tags 25 can boost the returned signal, and their relative positions and orientations. Additionally, experiments were carried out to determine a minimal number of transponder tags 25 needed for the golf ball 26 to be effectively and operably detected with full coverage.

In a non-limiting exemplary embodiment, experiments were conducted to determine a choice of optimal harmonic frequencies. The size of the transponder tag 25 for the application is highly restricted by the size of the golf ball 26. As frequencies get higher, the transponder tag 25 becomes smaller, but higher frequencies have shorter range. While lower frequencies provide longer detectable range, the transponder tag 25 sizes will increase. Golf balls have an average diameter of 42.67 mm, which limits the size of the transponder tag 25. Based on the experiments, when transponder tags 25 are bent and wrapped on the surface of the golf ball 26, their performance will change as well.

In a non-limiting exemplary embodiment, experiments were conducted to determine antenna polarization of the transponder tags 25—linear vs circular polarization. Linearly polarized antennas can only send out electromagnetic (EM) waves that are polarized in one linear direction. This means that if the transponder tags 25 are rotated to a certain angle such that their polarization is not consistent with the transceiver antenna, their ability to capture and reflect signals will be much weaker. And, if the transponder tags 25 polarization is perpendicular to the antennas' polarization orientation, then the transponder tags 25 will not reflect any signal. Circularly polarized antennas can send out the EM waves in a circularly polarized fashion, which means the instantaneous angle polarization keeps changing to cover the entire 360 degree surrounding the antenna. Therefore, transponder tag 25 orientations will no longer be an issue with circularly polarized antennas. This is critical for golf ball 26 localization since the golf ball 26 is round and can rotate to any orientation between 0-360 degrees.

In a non-limiting exemplary embodiment, as perhaps best shown in FIG. 8, an ON-OFF switch circuit block 161 turns the power of the RX circuit on and off at a designed frequency to establish On-and-Off Keying (OOK). It is used to detect stationary targets for the harmonic radar system 20. The OOK frequency is determined based on the applications and circuit performance.

In a non-limiting exemplary embodiment, as perhaps best shown in FIG. 9, the ON-OFF switch circuit block 161 turns the power of the RX circuit on and off at a designed frequency to establish ON-OFF Keying (OOK). It is used to detect stationary targets for the harmonic radar system 20. The OOK frequency is determined based on the applications and circuit performance.

Figure 21:
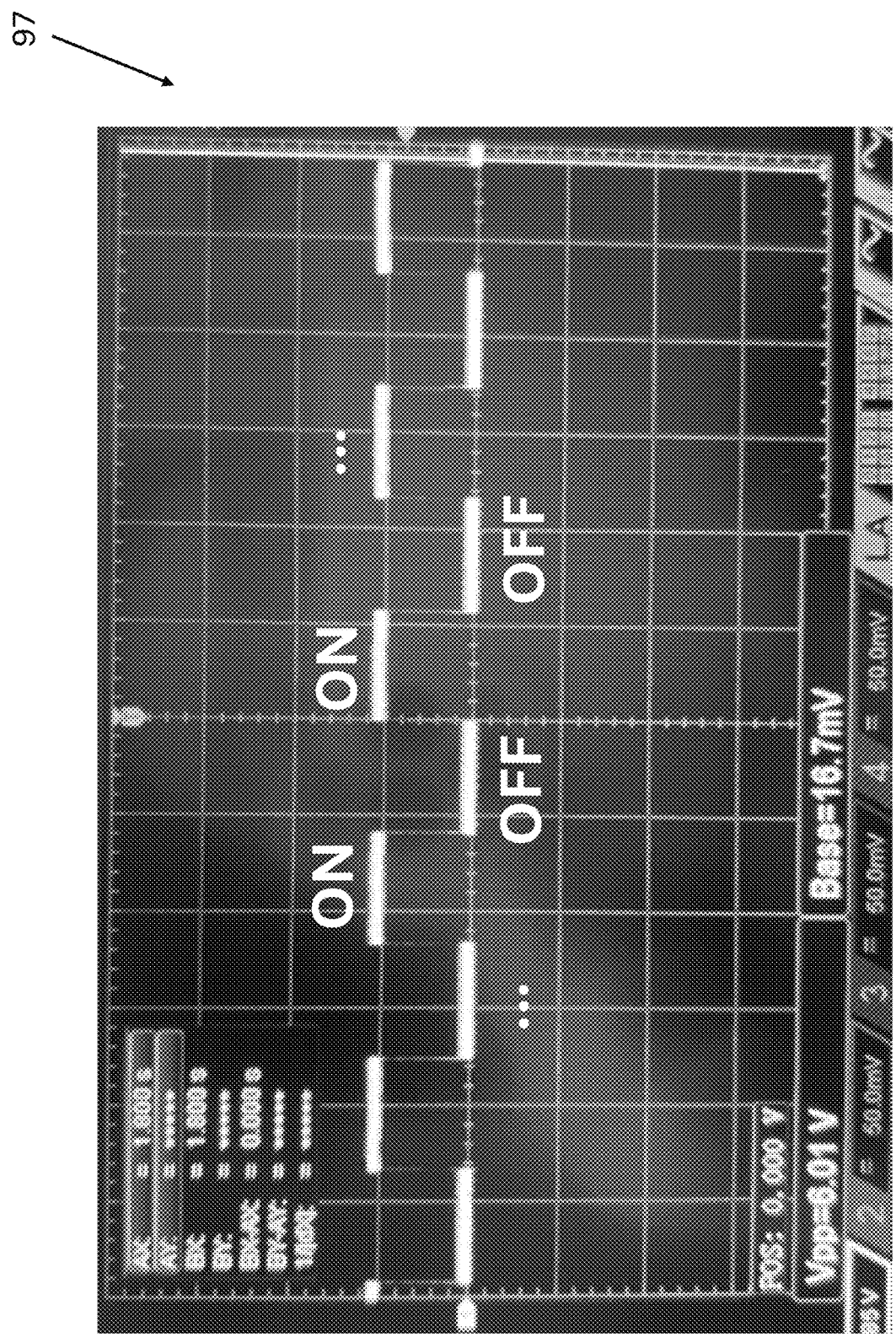
FIG. 21 is a graphical illustration of a baseband output of the receiver antenna detected signal (reflected return harmonic signal) pattern when a portable object has been detected, in accordance with a non-limiting exemplary embodiment of the present disclosure.

In a non-limiting exemplary embodiment, as perhaps best shown in FIGS. 1, 7A-12B, and 19-23, the nonlinear radar system 20 includes an On-Off Keying (OOK) signal modulation component that relies on a switching circuit 98 at the transmitter chain of the system 20 to provide on-and-off keying (OOK) modulation to the transmitting antenna 23: turning the transmission of fundamental radio frequency signals on and off at a given speed. Thus, the incident signal is an on-off-keying (OOK) signal, and the receiving antenna 24 will only respond to the reflected return harmonic signal reflected from the nonlinear tagged target (portable object 26a (e.g., golf ball, tennis ball, keys, bicycle, luggage, footwear, clothing, backpack, etc.)) but not react to natural objects like wood, grass, chair, etc. Therefore, at the baseband output of the receiver, the detected signal (reflected return harmonic signal) pattern 96 will look like FIG. 20 when there is no nonlinear tag (no portable object 26a(e.g., golf ball, tennis ball, keys, bicycle, luggage, footwear, clothing, backpack, etc.) detection). Conversely, FIG. 21 illustrates a detected signal (reflected return harmonic signal) pattern 97 when there is a nonlinear tag (portable object 26a (e.g., golf ball, tennis ball, keys, bicycle, luggage, footwear, clothing, backpack, etc.) detection) in front of the transceiver (e.g., handheld unit 21). OOK implementation is crucial for detecting stationary transponder tags 25 because it improves the overall robustness of the system 20.

As shown in FIGS. 1, 7A-12B, and 19-23, radio frequency source 1 may be a hardware block that generates the first radio frequency signal at f1 based on a baseband reference from radio frequency source 2. Radio frequency source 2 may be a hardware block that generates the second radio frequency signal at f2, and also generates a reference frequency for radio frequency source 1 and radio frequency source 3, so that the two transmitted radio frequency signals f1 and f2 as well as the signal of radio frequency source 3 are coherent. Radio frequency source 3 may be a hardware block that generates the third radio frequency signal at frequencies of 2f1-f2 or 2f2-f1 based on a baseband reference from radio frequency source 2. The power combiner may be a hardware block that combines radio frequency signals at f1 and f2 into one physical channel to be transmitted together by the TX antenna. It is noted that radio frequency source 1, radio frequency source 2, and power combiner can be replaced with one radio frequency generator if such a generator can coherently generate the two radio frequencies f1 and f2.

Referring to FIGS. 1, 7A-12B, and 19-23, the on-off keying (OOK) component may be a hardware block controlled by a preset program to switch on and off the transmitter based on a preset digital code sequence. This is a key building block that enables the receiver to identify a returned harmonic response from the tag that is in response to the transmitter itself. TX antenna may be a hardware block that radiates radio frequency signals at f1 and f2. RX antenna may be a hardware block the receives radio frequency signal generated by the tag at frequencies of 2f1-f2 or 2f2-f1. LNA module may be a hardware block that amplifies the signal received by the RX antenna. Mixer may be a hardware block that uses the signal generated by the radio frequency signal source 3 as the local oscillator (LO) signal to down-convert the RX antenna received signal at frequencies of 2f1-2 or 2f2-f1 to the baseband amplifier. Baseband amplifier may be a hardware block that amplifies the signal down-converted by the mixer. DAQ may be a hardware block named data acquisition (DAQ) unit, which acquires the amplified baseband signal. Output results from OOK keying may be a sample output detected by the system. Because of the on-off keying (OOK) at the transmitter side, the output results will have an on-off pattern that is synchronized with the on-off control of the OOK module.

Referring to FIGS. 1, 7A-12B, and 19-23 in general, the present disclosure includes a nonlinear radar system 20 including a transponder tag 25 attached to an existing portable object 26a (e.g., golf ball, tennis ball, keys, bicycle, luggage, footwear, clothing, backpack, etc.). Such a transponder tag 25 is in communication with and responsive to an incident signal having a first frequency wherein the transponder tag 25 includes an electromagnetic nonlinear element 28 configured to be detected by the incident signal. Advantageously, upon being detected by the incident signal, the transponder tag 25 is configured to transmit a reflected return harmonic signal having a second frequency different from the first frequency. Advantageously, the transponder tag 25 (e.g., electromagnetic nonlinear element 28) includes a plurality of stems 38a, and a plurality of lobes 38b coupled to distal ends of the stems 38a, respectively. Advantageously, a quantity of stems 38a equals a quantity of lobes 38b and have a 1:1 ratio. Such a structural/functional configuration yields the new, useful, and unexpected results of enabling the nonlinear radar system 20 to "see" an object 26a equipped with a nonlinear element 28 but not grass, leaves and other materials in the objects 26a immediate vicinity since they would not return a signal at a harmonic frequency.

In a non-limiting exemplary embodiment, the transponder tag 25 includes a snowflake 40 shape having a center 40a wherein the stems 38a are radially extended from the center 40a. Advantageously, the electromagnetic nonlinear element 28 is located at the snowflake 40 shape (electromagnetic nonlinear element 28 extends along stem 38a and lobe 38b with the diode 35 being located at the center 40a).

In a non-limiting exemplary embodiment, each of the lobes 38b includes a conductive layer 39 in electrical communication with the electromagnetic nonlinear element 28, respectively.

In a non-limiting exemplary embodiment, each of the lobes 38b emits a unique one of the reflected return harmonic signal.

In a non-limiting exemplary embodiment, the incident signal is an on-off-keying (OOK) signal.

Referring to FIGS. 1, 7A-12B, and 19-23 in general, the present disclosure further includes a nonlinear radar system 20 including a transponder tag 25 attached to an existing portable object 26a (e.g., golf ball, tennis ball, keys, bicycle, luggage, footwear, clothing, backpack, etc.). Such a transponder tag 25 is in communication with and responsive to an incident signal having a first frequency. Advantageously, transponder tag 25 includes an electromagnetic nonlinear element 28 being configured to be detected by the incident signal. Advantageously, upon being detected by the incident signal, the transponder tag 25 is configured to transmit a reflected return harmonic signal having a second frequency different from the first frequency. Advantageously, the transponder tag 25 is passive and does not require a power source other than incident radiation. Advantageously, the transponder tag 25 includes a snowflake 40 shape, wherein the electromagnetic nonlinear element 28 is located at the snowflake 40 shape (e.g., electromagnetic nonlinear element 28 extends along stem 38a and lobe 38b with the diode 35 being located at the center 40a). Such a structural/functional configuration yields the new, useful, and unexpected results of enabling the nonlinear radar system 20 to "see" an object 26a equipped with a nonlinear element 28 but not grass, leaves and other materials in the objects 26a immediate vicinity since they would not return a signal at a harmonic frequency.

In a non-limiting exemplary embodiment, the transponder tag 25 includes a plurality of stems 38a radially extended outwardly from a center 40a of the transponder tag 25, and a plurality of lobes 38b coupled to a distal end of the stems 38a, respectively. Advantageously, a quantity of stems 38a equals a quantity of lobes 38b and have a 1:1 ratio.

In a non-limiting exemplary embodiment, the snowflake 40 shape includes a center 40a and a plurality of stems 38a radially extended from the center 40a. Advantageously, the electromagnetic nonlinear element 28 is disposed at the snowflake 40 shape (electromagnetic nonlinear element 28 extends along stem 38a and lobe 38b with the diode 35 being located at the center 40a).

In a non-limiting exemplary embodiment, each of the lobes 38b includes a conductive layer 39 in electrical communication with the electromagnetic nonlinear element 28, respectively.

In a non-limiting exemplary embodiment, each of the lobes 38b emits a unique one of the reflected return harmonic signal.

Referring to FIGS. 1-23, the present disclosure further includes a nonlinear radar system 20 including a first antenna 23 configured to generate and emit an incident signal having a first frequency, a transponder tag 25 attached to an existing portable object 26a (e.g., golf ball, tennis ball, keys, bicycle, luggage, footwear, clothing, backpack, etc.), wherein the transponder tag 25 includes an electromagnetic nonlinear element 28 configured to be detected by the incident signal. Advantageously, upon being detected by the incident signal, the transponder tag 25 is configured to transmit a reflected return harmonic signal having a second frequency different from the first frequency. The reflected return harmonic signal is an on-off keying (OOK) signal. A second antenna 24 is configured to receive the reflected return harmonic signal having the second frequency. Advantageously, transponder tag 25 includes a conductive layer 39 in electrical communication with the electromagnetic nonlinear element 28, wherein the electromagnetic nonlinear element 28 includes a Schottky diode 35 (electromagnetic nonlinear element 28 extends along stem 38a and lobe 38b with the diode 35 is located at the center 40a). Such a structural/functional configuration yields the new, useful, and unexpected results of enabling the nonlinear radar system 20 to "see" an object 26a equipped with a nonlinear element 28 but not grass, leaves and other materials in the objects 26a immediate vicinity since they would not return a signal at a harmonic frequency.

In a non-limiting exemplary embodiment, system 20 further includes a handheld unit 21 including a display screen 22, a transmitting block 30 in communication with the electromagnetic nonlinear element 28 for generating and transmitting the incident signal within civilian-use-permitted frequency bands and at a power of about one watt, a receiving block 31 in communication with the electromagnetic nonlinear element 28 for receiving and processing the reflected return harmonic signal, and a processing block 32 configured to determine a signal strength of the reflected return harmonic signal and illustrate on the display screen 22 a distance from the existing portable object 26a (e.g., golf ball, tennis ball, keys, bicycle, luggage, footwear, clothing, backpack, etc.) to the handheld unit 21.

In a non-limiting exemplary embodiment, the handheld unit 21 is configured to radiate at two or more unique frequencies and further configured to receive at least one of the reflected return harmonic signal generated by the electromagnetic nonlinear element 28.

In a non-limiting exemplary embodiment, the transponder tag 25 is disposed at the existing portable object 26a (e.g., golf ball, tennis ball, keys, bicycle, luggage, footwear, clothing, backpack, etc.).

In a non-limiting exemplary embodiment, the transponder tag 25 is disposed on a surface of the existing portable object 26a (e.g., golf ball, tennis ball, keys, bicycle, luggage, footwear, clothing, backpack, etc.).

In a non-limiting exemplary embodiment, transponder tag 25 includes a plurality of stems 38a radially extended outwardly from a center 40a of the transponder tag 25, and a plurality of lobes 38b coupled to a distal end of the stems 38a, respectively. Advantageously, a quantity of stems 38a equals a quantity of lobes 38b and have a 1:1 ratio.

In a non-limiting exemplary embodiment, the transponder tag 25 includes a snowflake 40 shape having a center 40a and a plurality of stems 38a radially extended from the center 40a. Advantageously, the electromagnetic nonlinear element 28 is located at the snowflake 40 shape (electromagnetic nonlinear element 28 extends along stem 38a and lobe 38b with the diode 35 being located at the center 40a) and is in communication with the stems 38a and lobes 38b.

In a non-limiting exemplary embodiment, each of the lobes 38b includes a conductive layer 39 in electrical communication with the electromagnetic nonlinear element 28, respectively.

In a non-limiting exemplary embodiment, each of the lobes 38b emits a unique one of the reflected return harmonic signal.

In a non-limiting exemplary embodiment, each reflected return harmonic signal is configured to be detected by the receiving block 31 and analyzed by the processing block 32 to determine the distance and a direction from the existing portable object 26a (e.g., golf ball, tennis ball, keys, bicycle, luggage, footwear, clothing, backpack, etc.) to the handheld unit 21.

Referring back to FIG. 1, in a non-limiting exemplary embodiment, if the TX frequency is 8 GHz, the RX frequency would be 16 GHz. The specific frequencies presented in the figure are, as an example, not limited.

Figure 11:
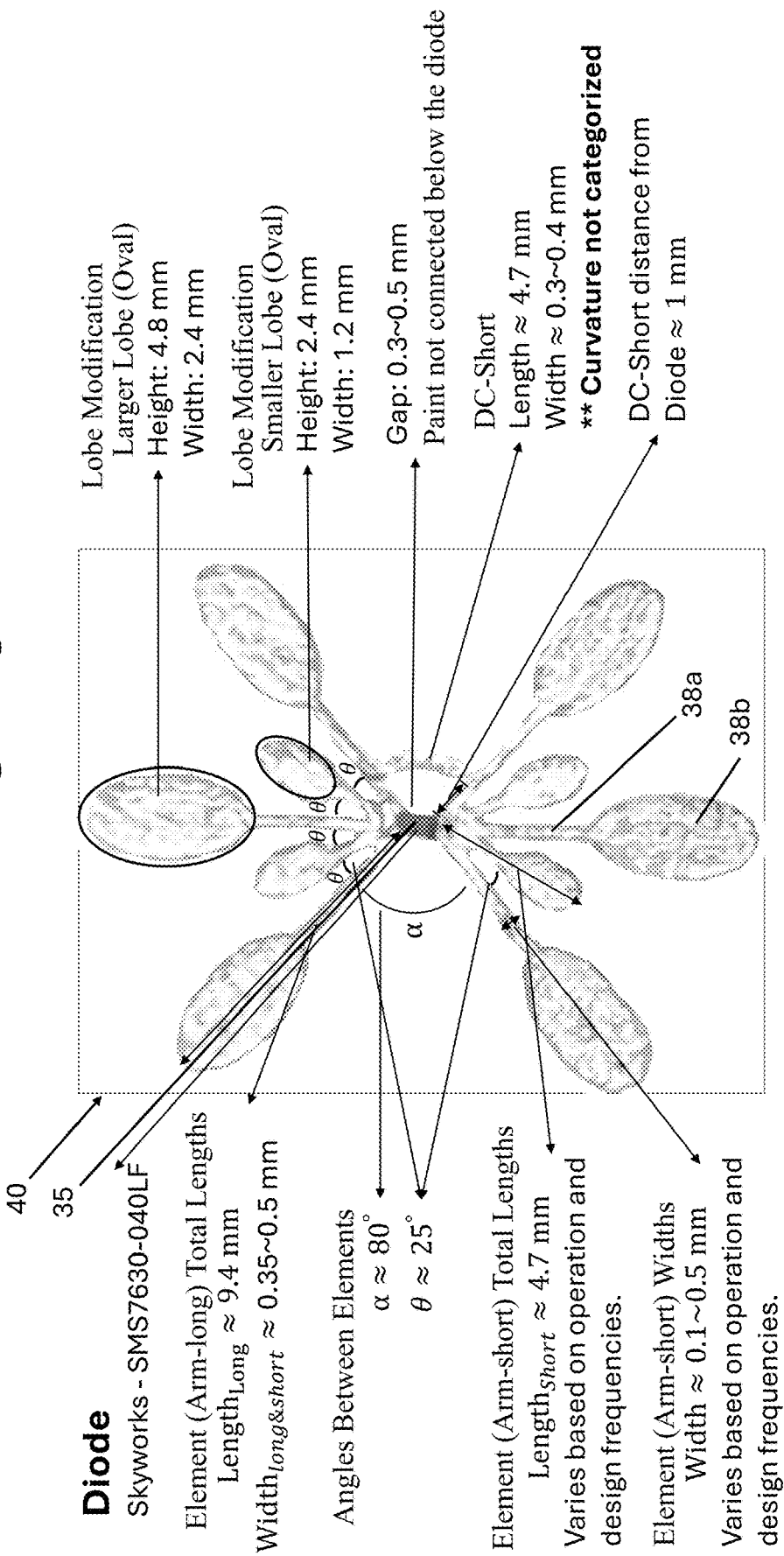
FIG. 11 is a top plan view of the snowflake nonlinear passive tag design extensions that vary based on the type of employed substrates and applications, in accordance with a non-limiting exemplary embodiment of the present disclosure.
Figure 12:
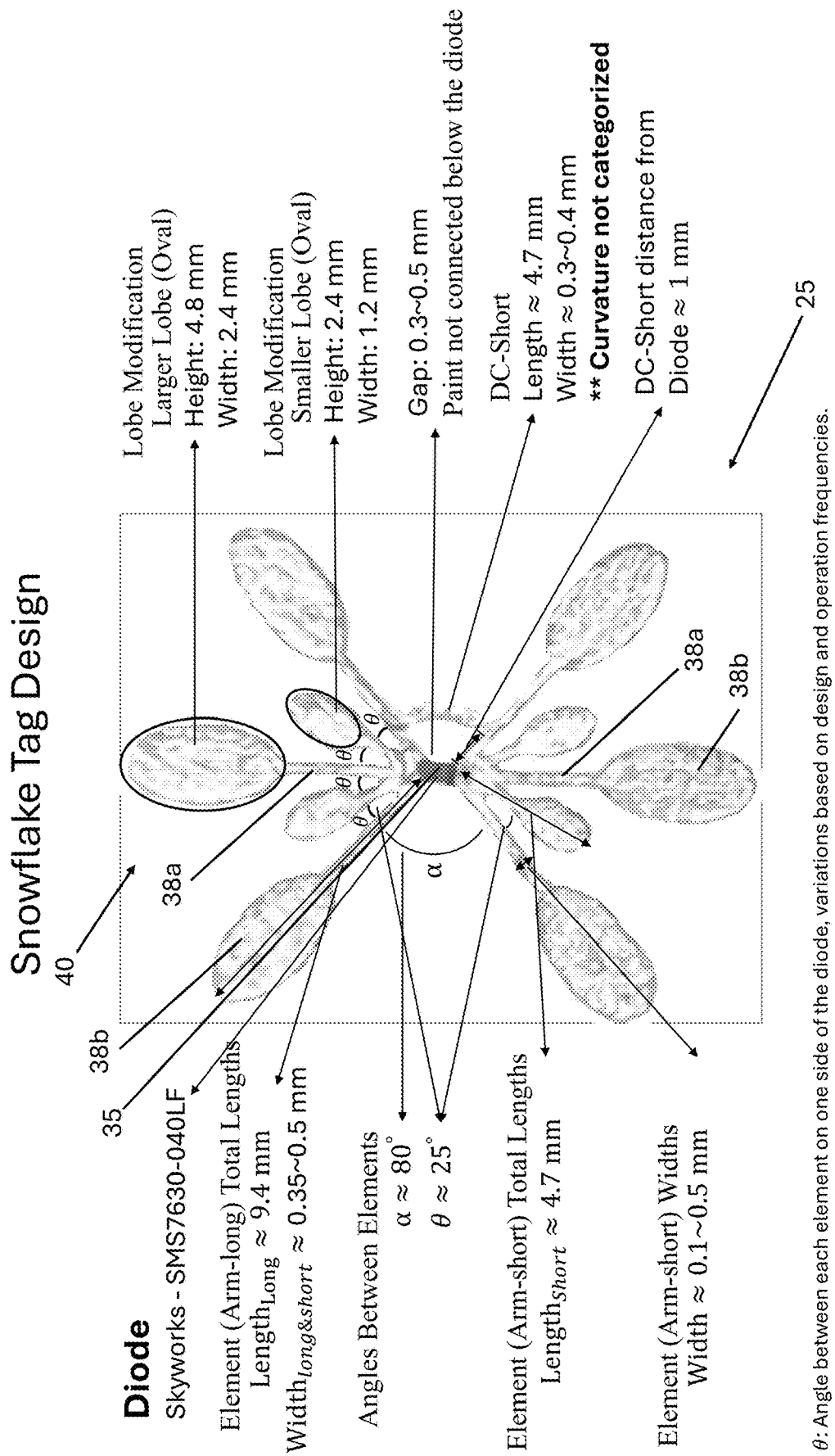
FIG. 12 is a top plan of a group of alternate snowflake nonlinear passive tag employed by the present disclosure, in accordance with a non-limiting exemplary embodiment of the present disclosure.
Figure 12A:
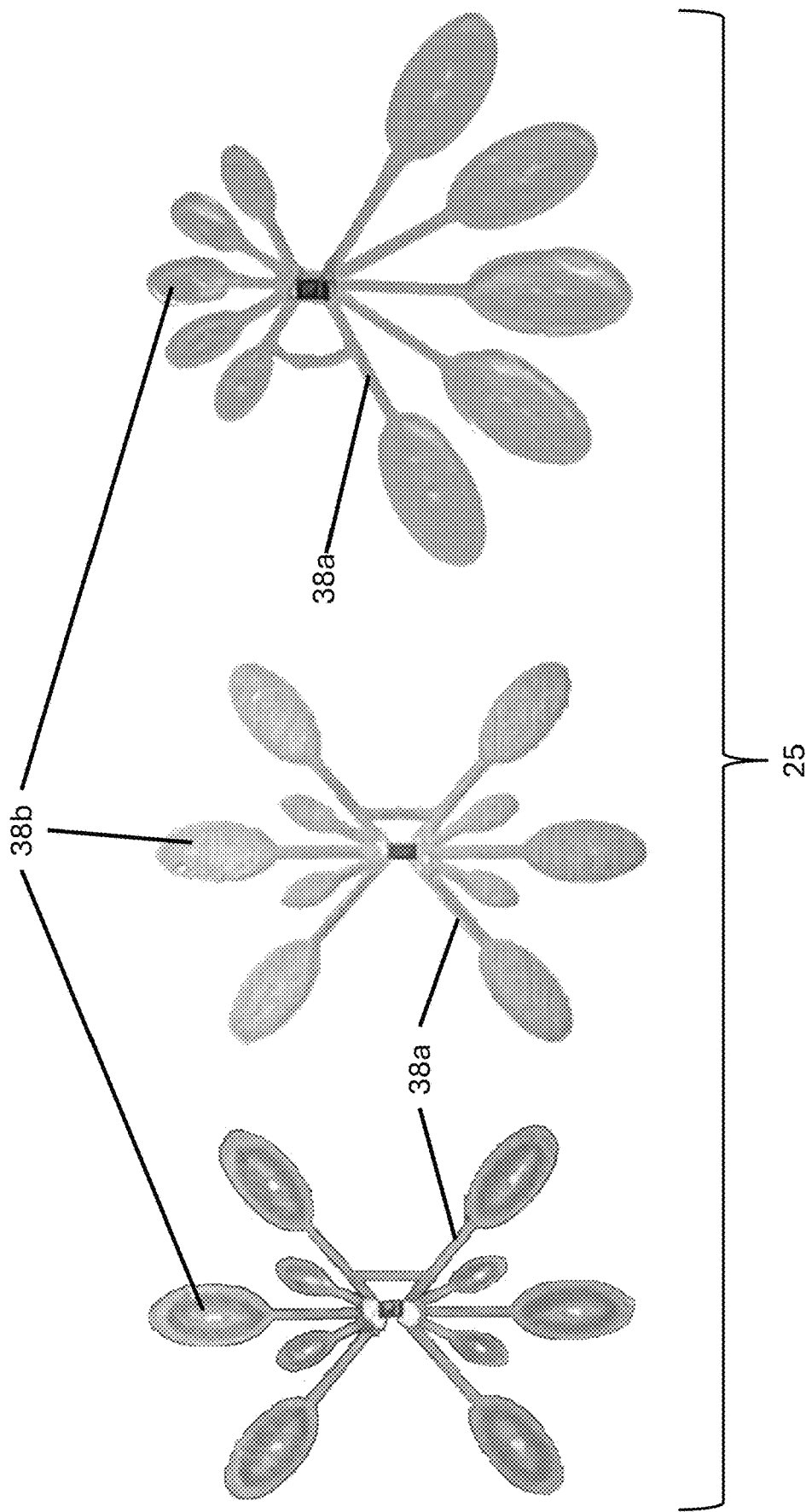
FIG. 12A illustrates different transponder tag designs (tag stems and lobes may have width and line shape variations based on the design frequency and their applications), fabrication methods, print materials, and substrates employed with the parameters shown in FIG. 11, in accordance with a non-limiting exemplary embodiment of the present disclosure.
Figure 12B:
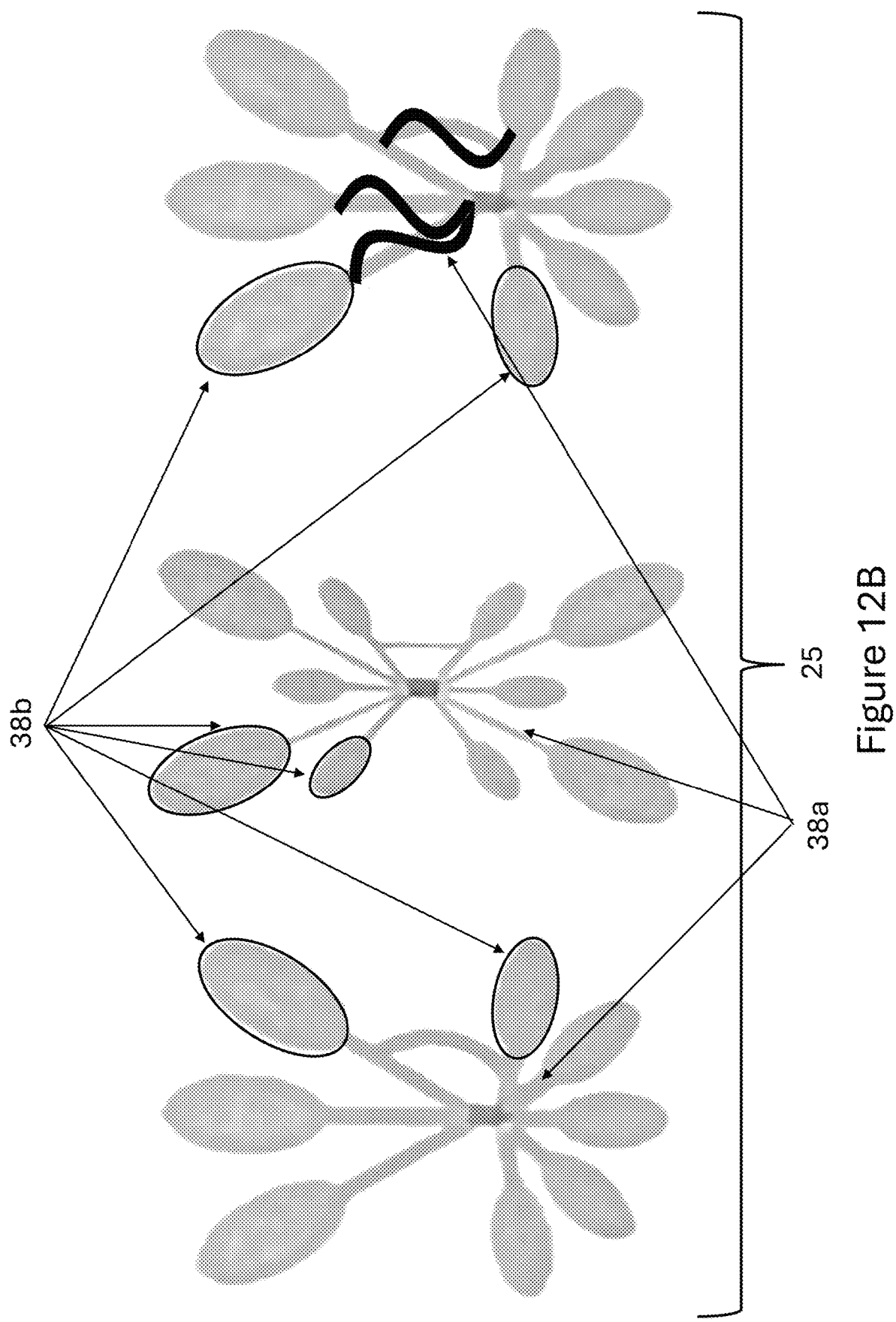
FIG. 12B illustrates yet additional transponder tag designs (tag stems and lobes may have width and line shape variations based on the design frequency and their applications), fabrication methods, print materials, and substrates employed with the parameters shown in FIG. 11, in accordance with a non-limiting exemplary embodiment of the present disclosure.

Referring back to FIG. 11, in a non-limiting exemplary embodiment, larger sized tags 25 may work better on Kapton substrates, and smaller tags 25 may work better on paper substrates. Furthermore, wider-angle separated elements 38a, 38b may work better when placed on the outer shell of a round object, whereas the smaller angle separated elements 38a, 38b may work better when lying flat. All the parameters listed in FIG. 11 are the possible variations to this design, which could have their own advantage over others when used in different applications, substrates, and tag 25 conditions, such as flat, bend, etc. Dimensions of the tags 25 and each element 38a, 38b vary based on their operating frequency and applications.

Referring again to FIG. 11, in a non-limited exemplary embodiment, the lobe 38b shape modifications are not limited to oval, solid fill. The lobe 38b sizes may vary. The DC short 56 shape is not limited to arc line, or single sided. The DC short 56 length, width, and position may be based on operation frequencies. The diode 35 is not limited to the specified SKYWORKS™-SMS7630-O40LF model.

Referring back to FIGS. 12-12B, in a non-limiting exemplary embodiment, fabrication with different print materials (copper, silver) and with different substrates (Kapton, paper) can be used in different applications. Kapton-printed tags 25 are robust against wet environments, whereas paper-printed tags 25 may be more suitable when the tag 25 is compressed and bent. Dimensions of the tags 25 and each element 38*a*, 38*b* vary based on their operating frequency and applications.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed as new and what is desired to secure by Letters Patent of the United States is:

1. A radar system comprising:
   a transponder tag attached to an existing portable object, said transponder tag being in communication with and responsive to an incident signal having a first frequency, said transponder tag including an electromagnetic nonlinear element being configured to be detected by said incident signal;
   wherein upon being detected by said incident signal, said transponder tag being configured to transmit a reflected return harmonic signal having a second frequency different from said first frequency;
   wherein said transponder tag includes
      a plurality of stems, and
      a plurality of lobes coupled to distal ends of said stems, respectively;
   wherein a quantity of said stems equals a quantity of said lobes and have a 1:1 ratio.

2. The radar system of claim 1, wherein said transponder tag comprises:
   a snowflake shape having a center and said stems being radially extended from said center; wherein said electromagnetic nonlinear element is located at said snowflake shape.

3. The radar system of claim 1, wherein each of said lobes comprises:
   a conductive layer in electrical communication with said electromagnetic nonlinear element, respectively.

4. The radar system of claim 1, wherein each of said lobes emits a unique one of said reflected return harmonic signal.

5. The radar system of claim 1, wherein said incident signal is an on-off-keying (OOK) signal.

6. A radar system comprising:
   a transponder tag attached to an existing portable object, said transponder tag being in communication with and responsive to an incident signal having a first frequency, said transponder tag including an electromagnetic nonlinear element being configured to be detected by said incident signal;
   wherein upon being detected by said incident signal, said transponder tag being configured to transmit a reflected return harmonic signal having a second frequency different from said first frequency;
wherein said transponder tag is passive and does not require a power source other than incident radiation;
wherein said transponder tag includes a snowflake shape;
wherein said electromagnetic nonlinear element is located at said snowflake shape.

7. The radar system of claim 6, wherein said transponder tag comprises:
a plurality of stems radially extended outwardly from a center of said transponder tag; and
a plurality of lobes coupled to a distal end of said stems, respectively;
wherein a quantity of said stems equals a quantity of said lobes and have a 1:1 ratio.

8. The radar system of claim 7, wherein each of said lobes comprises:
a conductive layer in electrical communication with said electromagnetic nonlinear element, respectively.

9. The radar system of claim 7, wherein each of said lobes emits a unique one of said reflected return harmonic signal.

10. The radar system of claim 6, wherein said snowflake shape comprises:
a center and a plurality of stems radially extended from said center; wherein said electromagnetic nonlinear element is disposed at said snowflake shape.

11. A radar system comprising:
a first antenna configured to generate and emit an incident signal having a first frequency;
a transponder tag attached to an existing portable object, said transponder tag including an electromagnetic nonlinear element being configured to be detected by said incident signal;
wherein upon being detected by said incident signal, said transponder tag being configured to transmit a reflected return harmonic signal having a second frequency different from said first frequency; wherein said reflected return harmonic signal is an on-off keying (OOK) signal; and
a second antenna configured to receive said reflected return harmonic signal having said second frequency;
wherein said transponder tag includes a conductive layer in electrical communication with said electromagnetic nonlinear element, wherein said electromagnetic nonlinear element includes a Schottky diode.

12. The radar system of claim 11, further comprising: a handheld unit including
a display screen;
a transmitting block in communication with said electromagnetic nonlinear element for generating and transmitting said incident signal within civilian-use-permitted frequency bands and at a power of about one watt;
a receiving block in communication with said electromagnetic nonlinear element for receiving and processing said reflected return harmonic signal; and
a processing block configured to determine a signal strength of said reflected return harmonic signal and illustrate on said display screen a distance from the existing portable object to said handheld unit.

13. The radar system of claim 12, wherein said handheld unit is configured to radiate at two or more unique frequencies and further configured to receive at least one of said reflected return harmonic signal generated by said electromagnetic nonlinear element.

14. The radar system of claim 12, wherein each said reflected return harmonic signal is configured to be detected by said receiving block and analyzed by said processing block to determine said distance and a direction from the existing portable object to said handheld unit.

15. The radar system of claim 11, wherein said transponder tag is disposed at the existing portable object.

16. The radar system of claim 11, wherein said transponder tag is disposed on a surface of the existing portable object.

17. The radar system of claim 11, wherein transponder tag comprises:
a plurality of stems radially extended outwardly from a center of said transponder tag; and
a plurality of lobes coupled to a distal end of said stems, respectively;
wherein a quantity of said stems equals a quantity of said lobes and have a 1:1 ratio.

18. The radar system of claim 17, wherein each of said lobes comprises: a conductive layer in electrical communication with said electromagnetic nonlinear element, respectively.

19. The radar system of claim 17, wherein each of said lobes emits a unique one of said reflected return harmonic signal.

20. The radar system of claim 11, wherein said transponder tag comprises:
a snowflake shape having a center and a plurality of stems radially extended from said center; wherein said electromagnetic nonlinear element is disposed at said snowflake shape.

* * * * *